US012621587B2

(12) United States Patent
Nakanishi

(10) Patent No.: US 12,621,587 B2
(45) Date of Patent: May 5, 2026

(54) IMAGE CAPTURING ELEMENT AND IMAGE CAPTURING APPARATUS

(71) Applicant: NIKON CORPORATION, Tokyo (JP)

(72) Inventor: Sota Nakanishi, Kawasaki (JP)

(73) Assignee: NIKON CORPORATION, Tokyo (JP)

(*) Notice: Subject to any disclaimer, the term of this patent is extended or adjusted under 35 U.S.C. 154(b) by 146 days.

(21) Appl. No.: 18/375,148

(22) Filed: Sep. 29, 2023

(65) Prior Publication Data

US 2024/0107198 A1     Mar. 28, 2024

Related U.S. Application Data

(63) Continuation of application No. PCT/JP2022/016113, filed on Mar. 30, 2022.

(30) Foreign Application Priority Data

Mar. 31, 2021     (JP) ................................. 2021-062186

(51) Int. Cl.
*H04N 25/77*          (2023.01)
*H04N 25/772*         (2023.01)
(52) U.S. Cl.
CPC ................................ *H04N 25/772* (2023.01)
(58) Field of Classification Search
CPC .................................................... H04N 25/772
See application file for complete search history.

(56) References Cited

U.S. PATENT DOCUMENTS

| | | | |
|---|---|---|---|
| 2018/0122847 A1 | 5/2018 | Mabuchi et al. | |
| 2018/0220093 A1* | 8/2018 | Murao | ................ H10F 39/8027 |
| 2019/0081100 A1 | 3/2019 | Matsumoto et al. | |

FOREIGN PATENT DOCUMENTS

| | | |
|---|---|---|
| JP | 2006-049361 A | 2/2006 |
| JP | 2018-125845 A | 8/2018 |
| JP | 2020-065072 A | 4/2020 |
| WO | 2020/262461 A1 | 12/2020 |

OTHER PUBLICATIONS

Dec. 24, 2024 Office Action issued in Japanese Patent Application No. 2023-511497.
Aug. 6, 2024 Office Action issued in Japanese Patent Application No. 2023-511497.
Jun. 14, 2022 International Search Report issued International Patent Application No. PCT/JP2022/016113.

* cited by examiner

*Primary Examiner* — Lin Ye
*Assistant Examiner* — Fayez A Bhuiyan
(74) *Attorney, Agent, or Firm* — Oliff PLC

(57)          ABSTRACT
An image capturing element includes a first substrate having a plurality of pixel blocks including at least one pixel, the plurality of pixel blocks being arranged to be aligned in a row direction and a column direction, and a second substrate having a plurality of control blocks including a conversion unit which converts a signal output from the pixel into a digital signal and a through electrode unit configured to output the signal converted into the digital signal by the conversion unit, the plurality of control blocks being arranged to be aligned in the row direction and the column direction.

24 Claims, 20 Drawing Sheets

Figure 1:
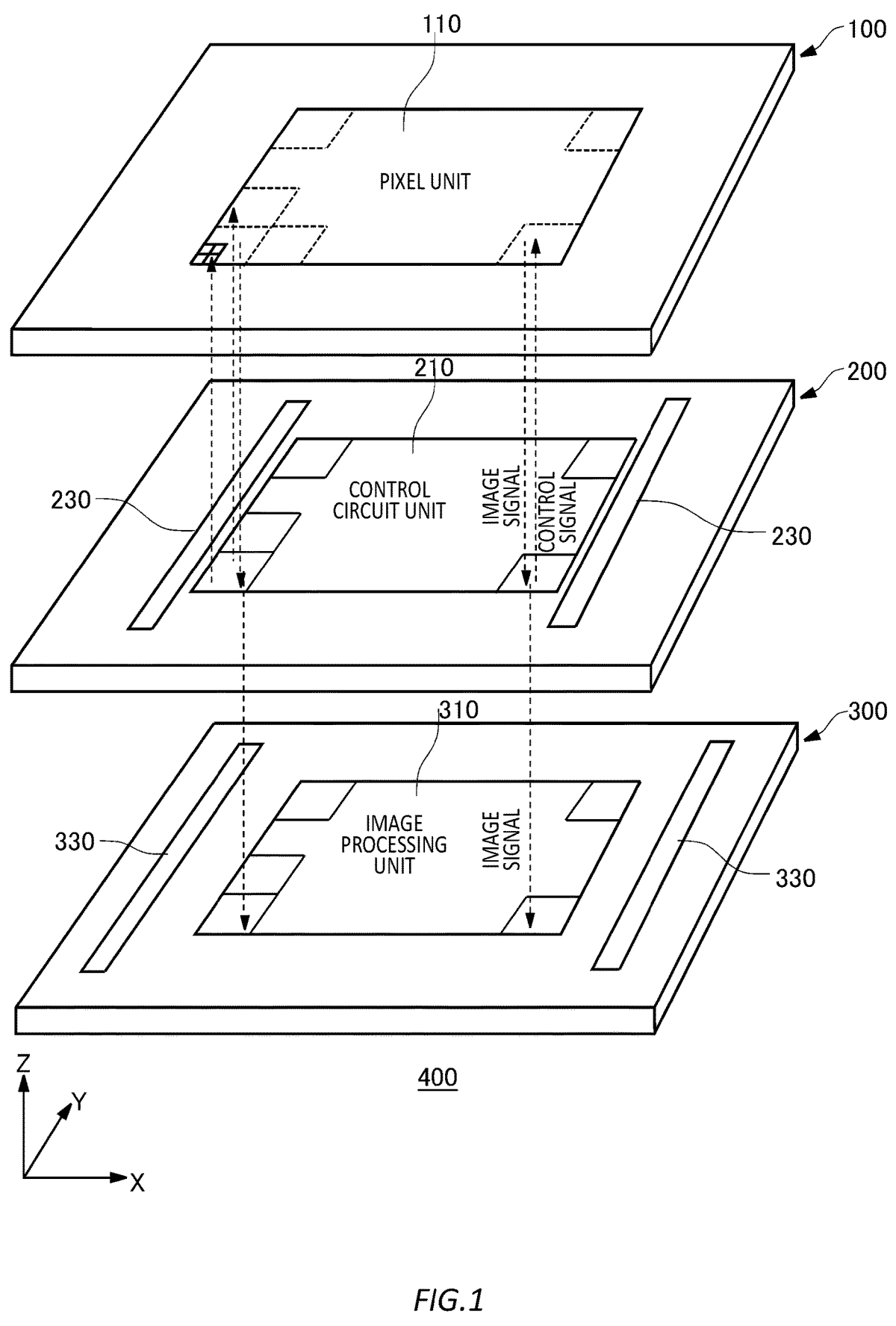

110

100

PIXEL UNIT

210

200

230

CONTROL
CIRCUIT UNIT

IMAGE
SIGNAL

CONTROL
SIGNAL

230

310

300

330

IMAGE
PROCESSING
UNIT

IMAGE
SIGNAL

IMAGE CAPTURING ELEMENT AND IMAGE CAPTURING APPARATUS

BACKGROUND

1. Technical Field

The present invention relates to an image capturing element and an image capturing apparatus.

2. Related Art

An image capturing element constituted by layering semiconductor chips one above the other has been proposed (for example, Patent Document 1). A higher functionality has been demanded more than before.

PRIOR ART DOCUMENT

Patent Document

Patent Document 1: Japanese Patent Application Publication No. 2006-49361

SUMMARY

According to a first aspect of the present invention, there is provided an image capturing element including a first substrate having a plurality of pixel blocks including at least one pixel, the plurality of pixel blocks being arranged to be aligned in a row direction and a column direction, and a second substrate having a plurality of control blocks including a conversion unit which converts a signal which is output from the pixel into a digital signal and a through electrode unit configured to output the signal converted into the digital signal by the conversion unit, the plurality of control blocks being arranged to be aligned in the row direction and the column direction.

According to a second aspect of the present invention, there is provided an image capturing apparatus including the image capturing element.

Note that the summary clause does not necessarily describe all necessary features of the embodiments of the present invention. The present invention may also be a sub-combination of the features described above.

BRIEF DESCRIPTION OF THE DRAWINGS

FIG. 1 illustrates an overview of an image capturing element 400.

DESCRIPTION OF EXEMPLARY EMBODIMENTS

Figure 2:
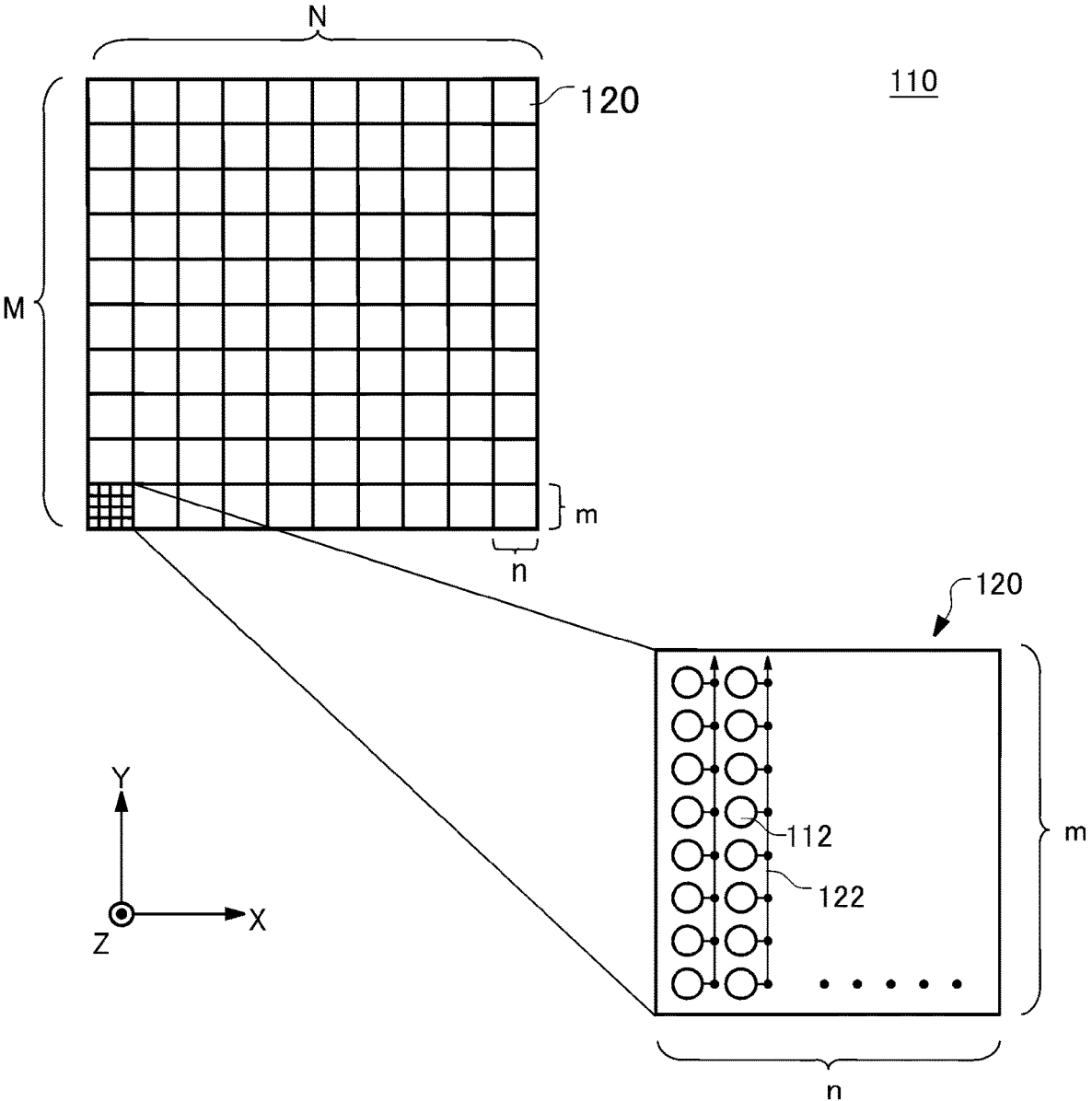
FIG. 2 illustrates an example of a specific configuration of a pixel unit 110.

Hereinafter, the present invention will be described through embodiments of the invention, but the following embodiments do not limit the invention according to claims. In addition, not all of the combinations of features described in the embodiments are essential to the solving means of the invention.

In the present specification, the X axis and the Y axis are orthogonal to each other, and the Z axis is orthogonal to the XY plane. The XYZ axes constitute a right-handed system. A direction parallel to the Z axis may be referred to as a stacking direction of the image capturing element. As used herein, the terms "upper" and "lower" are not limited to the upper and lower direction in the direction of gravity. These terms just refer to relative directions in the Z axis direction. Note that, in the present specification, the alignment in the X axis direction is described as a "row" and the alignment in the Y axis direction is described as a "column", but the row direction and the column direction are not limited thereto.

FIG. 1 illustrates an overview of an image capturing element 400. The image capturing element 400 is configured to capture a subject. The image capturing element 400 is configured to generate image data of the captured subject. The image capturing element 400 includes a first substrate 100, a second substrate 200, and a third substrate 300. As illustrated in FIG. 1, the first substrate 100 is stacked above the second substrate 200. In addition, the second substrate 200 is stacked above the third substrate 300.

The first substrate 100 has a pixel unit 110. Light is incident on the pixel unit 110. The pixel unit 110 is configured to output a pixel signal based on incident light. The first substrate 100 may be referred to as a pixel chip.

The second substrate 200 has a control circuit unit 210 and peripheral circuit units 230. The second substrate 200 may be referred to as a processing circuit chip.

In the second substrate 200, the control circuit unit 210 of the present example is arranged at a position facing the pixel unit 110. The control circuit unit 210 outputs, to the pixel unit 110, a control signal for controlling drive of the pixel unit 110. A pixel signal which is output from the pixel unit 110 is further input to the control circuit unit 210.

The control circuit unit 210 performs signal processing on the pixel signal. For example, the control circuit unit 210 performs processing to convert an analog signal into a digital signal. Specifically, the control circuit unit 210 performs processing to convert the input pixel signal into a digital signal. The control circuit unit 210 may perform other signal processing. Examples of the other signal processing include noise removal processing such as analog or digital correlated double sampling (CDS).

The peripheral circuit unit 230 controls drive of the control circuit unit 210. In the second substrate 200, the peripheral circuit unit 230 is arranged in a surrounding of the control circuit unit 210. In addition, the peripheral circuit unit 230 may be electrically connected to the first substrate 100 to control drive of the pixel unit 110. Although the peripheral circuit units 230 of the present example are arranged along two opposite sides of the second substrate 200, an arrangement method of the peripheral circuit units 230 is not limited to the present example.

The third substrate 300 has an image processing unit 310 and peripheral circuit units 330. The third substrate 300 may be referred to as an image processing chip. Although the peripheral circuit units 330 of the present example are arranged along two opposite sides of the third substrate 300, an arrangement method of the peripheral circuit units 330 is not limited to the present example.

In the third substrate 300, the image processing unit 310 of the present example is arranged at a position facing the control circuit unit 210. The image processing unit 310 performs image processing on a pixel signal which is output by the control circuit unit 210. Note that a structure of the image capturing element 400 may be of a back side illumination type or of a front side illumination type.

FIG. 2 illustrates an example of a specific configuration of the pixel unit 110. In the present example, the pixel unit 110 and an enlarged view of a pixel block 120 provided to the pixel unit 110 are shown.

The pixel unit 110 has a plurality of pixel blocks 120 arranged to be aligned along a row direction and a column direction. The pixel unit 110 of the present example has M×N (M and N are natural numbers) pixel blocks 120. The present example shows a case where M is equal to N, but M and N may be different.

The pixel block 120 has at least one pixel 112. The pixel block 120 of the present example has m×n (m and n are natural numbers) pixels 112. For example, the pixel block 120 has 16×16 pixels 112. The number of the pixels 112 corresponding to the pixel block 120 is not limited thereto. The present example shows a case where m is equal to n, but m and n may be different. The pixel block 120 has a plurality of pixels 112 connected to a common control line in the row direction. For example, each of the pixels 112 in the pixel block 120 is connected to the common control line so as to be set to have a same exposure time. In an example, n pixels 112 aligned in the row direction are connected by the common control line.

On the other hand, a plurality of mutual pixel blocks 120 may be set to have an exposure time different from each other. That is, each of the pixels 112 in the pixel block 120 have a same exposure time, but a different exposure time may be set in another pixel block 120. For example, when the pixels 112 in the pixel block 120 are connected by a common control line in the row direction, pixels 112 in another pixel block 120 are commonly connected by a different control line.

The pixel block 120 is arranged so as to correspond to a control block 220 which will be described below. According to the present embodiment, the single pixel block 120 is arranged for the single control block 220.

The pixel 112 has a photoelectric conversion function of converting light into electric charges. The pixel 112 is configured to accumulate the photoelectrically converted electric charges. The m pixels 112 are arranged to be aligned along the column direction and are connected to a common signal line 122. Then, the m pixels 112 are aligned and arrayed in the n columns in the row direction in the pixel block 120.

In other words, the pixel block 120 is an assembly of a plurality of pixels 112 connected by a common control line. In addition, it can be mentioned that the pixel block 120 is a minimum unit of a circuit of the plurality of pixels 112 set to have a same exposure time.

Figure 3:
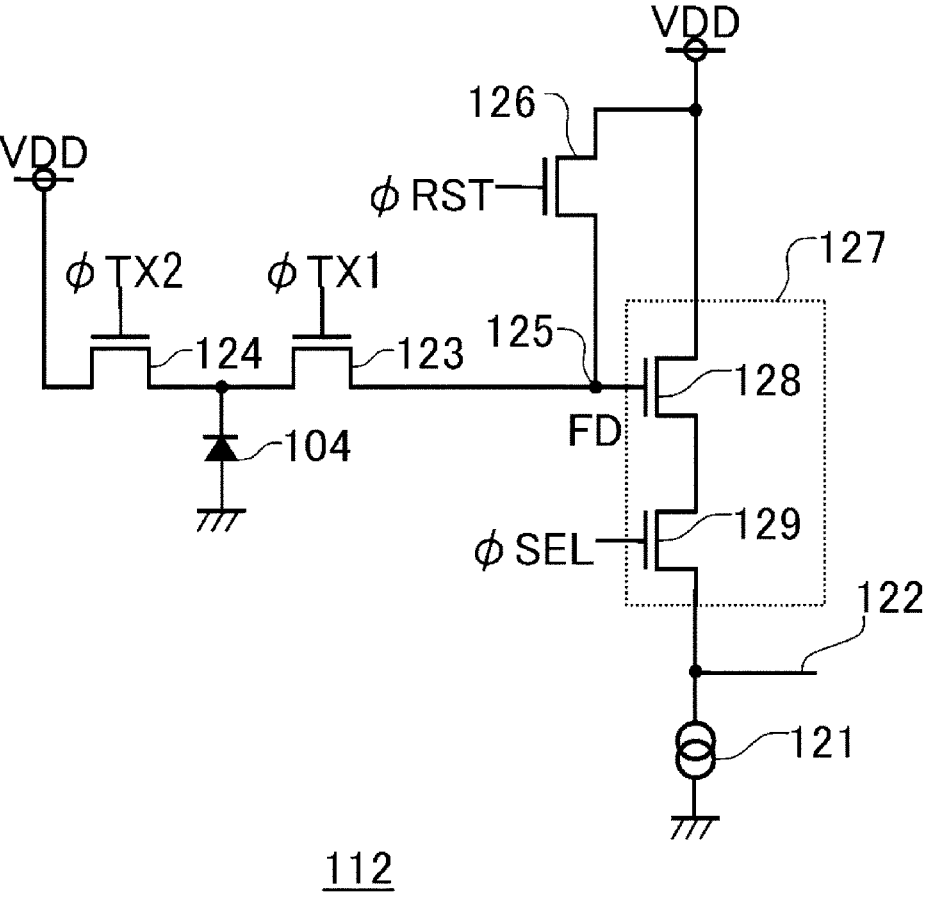
FIG. 3 illustrates an example of a circuit configuration of a pixel 112.

FIG. 3 illustrates an example of a circuit configuration of the pixel 112. The pixel 112 includes a photoelectric conversion unit 104, a transfer unit 123, a discharge unit 124, a reset unit 126, and a pixel output unit 127. The pixel output unit 127 has an amplification unit 128 and a selection unit 129. In the present example, the transfer unit 123, the discharge unit 124, the reset unit 126, the amplification unit 128, and the selection unit 129 are described as an N channel FET, but a type of the transistor is not limited to this.

The photoelectric conversion unit 104 has a photoelectric conversion function of converting light into electric charges. The photoelectric conversion unit 104 is configured to accumulate the photoelectrically converted electric charges. The photoelectric conversion unit 104 is, for example, a photodiode.

The transfer unit 123 transfers the electric charges accumulated in the photoelectric conversion unit 104 to an accumulation unit 125. The transfer unit 123 is an example of a transfer gate for transferring the electric charges of the photoelectric conversion unit 104. In other words, the transfer unit 123 is set as a gate, the photoelectric conversion unit 104 is set as a source, and the accumulation unit 125 is set as a drain, so that these configure a so-called transfer transistor. A gate terminal of the transfer unit 123 is connected to a local transfer control line for each of the pixel blocks 120 for inputting a control signal ϕTX1.

The discharge unit 124 discharges the electric charges accumulated in the photoelectric conversion unit 104 to a power supply wiring through which a power supply voltage VDD is supplied. A gate terminal of the discharge unit 124 is connected to a local discharge control line for each of the pixel blocks 120 for inputting a discharge control signal ϕTX2. Note that in the present example, the description has been provided where the discharge unit 124 discharges the electric charges of the photoelectric conversion unit 104 to the power supply wiring through which the power supply voltage VDD is supplied, but the discharge unit 124 may discharge the electric charges to a power supply wiring through which a power supply voltage different from the power supply voltage VDD is supplied.

The electric charges from the photoelectric conversion unit 104 are transferred to the accumulation unit 125 by the transfer unit 123. The accumulation unit 125 is an example of a floating diffusion (FD).

The reset unit 126 is configured to discharge the electric charges of the accumulation unit 125 to the power supply wiring through which the predetermined power supply voltage VDD is supplied. A gate terminal of the reset unit 126 is connected to a global reset control line over a plurality of pixel blocks 120 for inputting a reset control signal ϕRST.

The pixel output unit 127 is configured to output a signal based on a potential of the accumulation unit 125 to the signal line 122. The pixel output unit 127 has the amplification unit 128 and the selection unit 129. The amplification unit 128 has a gate terminal connected to the accumulation unit 125, a drain terminal connected to the power supply wiring through which the power supply voltage VDD is supplied, and a source terminal connected to a drain terminal of the selection unit 129.

The selection unit 129 is configured to control electrical connection between the pixel 112 and the signal line 122. When the pixel 112 and the signal line 122 are electrically connected by the selection unit 129, a pixel signal is output from the pixel 112 to the signal line 122. A gate terminal of the selection unit 129 is connected to a global selection control line over a plurality of pixel blocks 120 for inputting a selection control signal φSEL. A source terminal of the selection unit 129 is connected to a load current source 121.

The load current source 121 is configured to supply a current to the signal line 122. The load current source 121 may be provided to the first substrate 100, or may be provided to the second substrate 200.

Hereinafter, any of a signal based on the electric charges accumulated in the photoelectric conversion unit 104, a signal based on the electric charges transferred to the accumulation unit 125, and a signal based on the potential of the accumulation unit 125 or these may be collectively referred to as a pixel signal.

As an additional remark, the pixel 112 includes at least one photoelectric conversion unit 104, the pixel output unit 127 serving as a read unit which reads an image signal from the at least one photoelectric conversion unit 104 to the signal line 122, and the like. It can also be mentioned that the pixel 112 is a minimum unit of a circuit which outputs a pixel signal configuring an image to the signal line 122.

Figure 4:
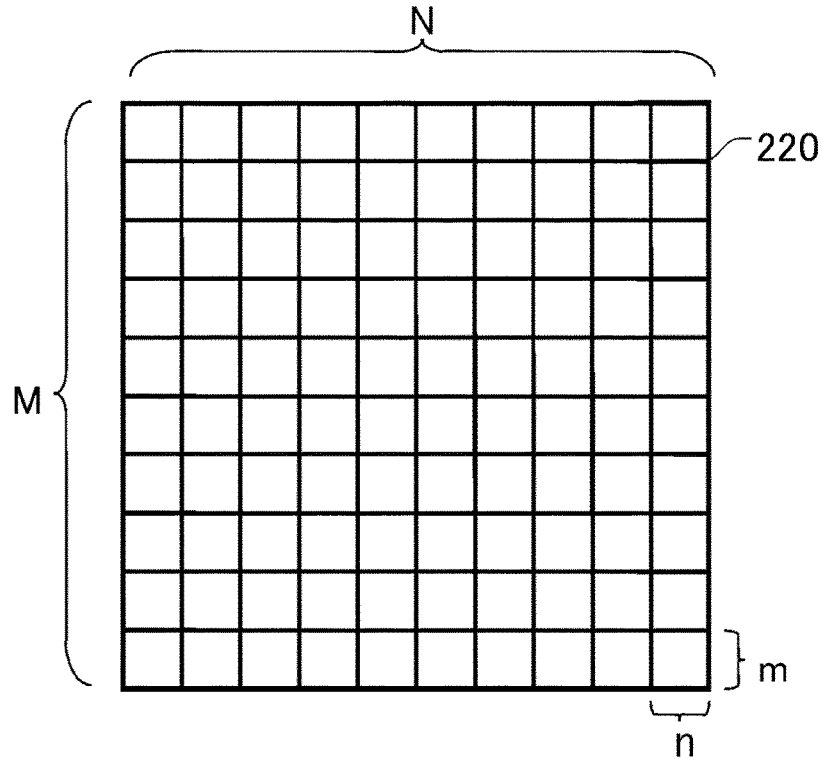
FIG. 4 illustrates an example of a more specific configuration of a control circuit unit 210.
Figure 4:
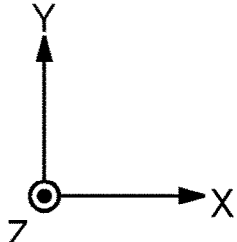

FIG. 4 illustrates an example of a more specific configuration of the control circuit unit 210. The control circuit unit 210 has the control blocks 220 arranged to be aligned in the row direction and the column direction. The control circuit unit 210 of the present example has M×N control blocks 220.

The control blocks 220 are arranged at positions corresponding to the pixel blocks 120, respectively. For example, the control block 220 and the pixel block 120 are arranged at overlapped positions as viewed from a stacking direction of the first substrate 100 and the second substrate 200. In this case, an area of the control block 220 and an area of the pixel block 120 may be substantially the same with a margin between the adjacent blocks included.

Figure 5:
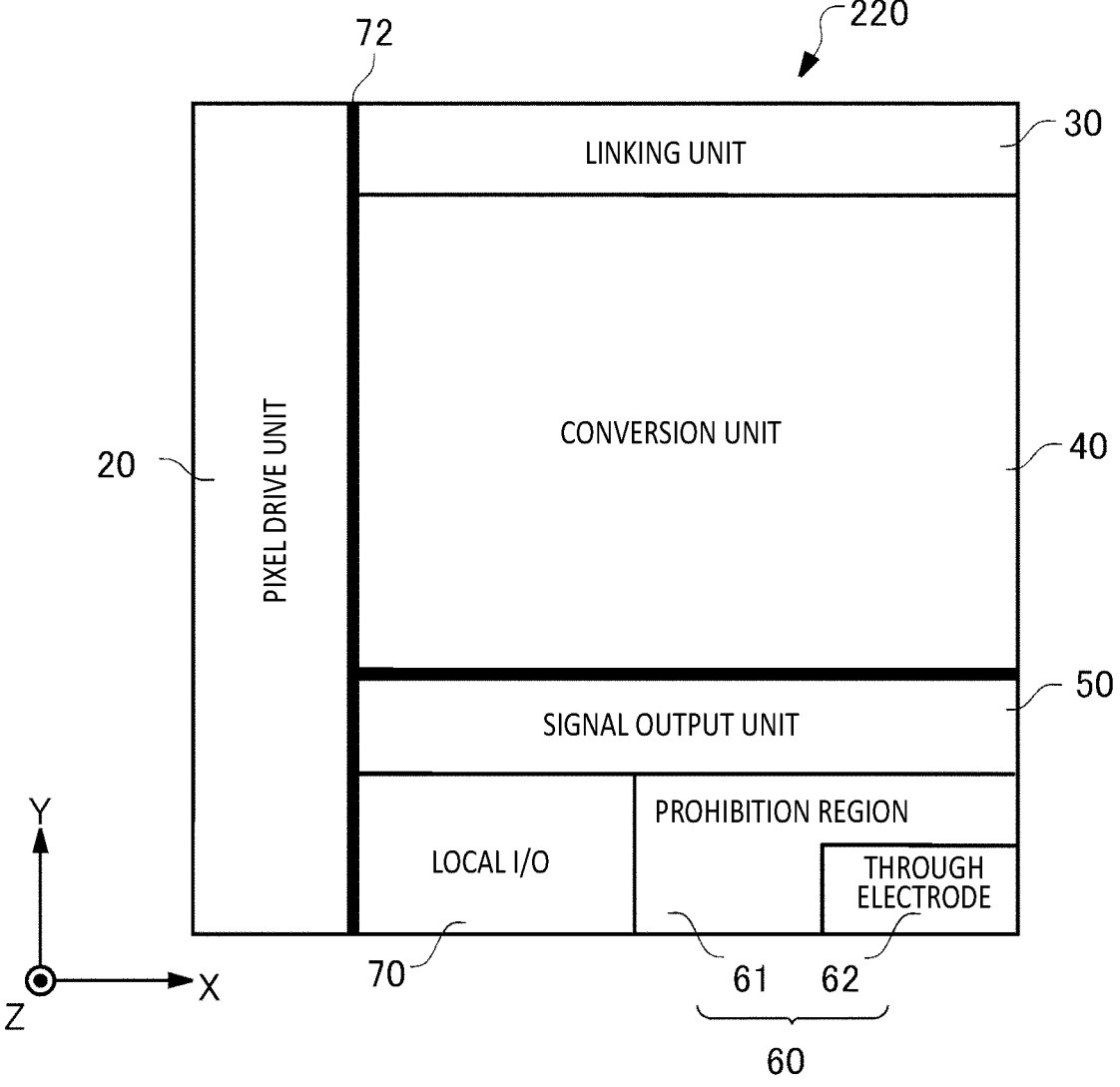
FIG. 5 illustrates an example of a more specific configuration of a control block 220.

FIG. 5 illustrates an example of a more specific configuration of the control block 220. The control block 220 is configured to control drive of the corresponding pixel block 120. For example, the control block 220 is configured to control an exposure time of the pixel block 120. In addition, the control block 220 has a processing circuit such as an AD converter, and is configured to process a signal which is output by the pixel block 120. In an example, the control block 220 is configured to convert an analog pixel signal which is output from the corresponding pixel block 120 into a digital signal. The control block 220 of the present example includes a pixel drive unit 20, a linking unit 30, a conversion unit 40, a signal output unit 50, a local I/O, and a through electrode region 60.

The pixel drive unit 20 controls exposure of a plurality of pixels 112 and also drives the plurality of pixels 112. The pixel drive unit 20 generates a signal for controlling an exposure time of the pixels 112. In an example, the pixel drive unit 20 adjusts at least one of a starting timing or an ending timing of the exposure to control an exposure time for each of the pixel blocks 120.

The pixel drive unit 20 is electrically connected to the plurality of pixels 112. The pixel drive unit 20 is configured to select and drive any pixel 112 from the plurality of pixels 112. The pixel drive unit 20 is arranged at a position corresponding to the m pixels 112 arranged in the column direction. Since the image capturing element 400 can set an exposure time for each of the pixel blocks 120 according to an intensity of incident light, it is possible to expand a dynamic range.

The linking unit 30 links the first substrate 100 and the second substrate 200. The linking unit 30 inputs a pixel signal which is input from the first substrate 100 to the signal conversion unit 40. The linking unit 30 is provided so as to correspond to the n pixels 112 arranged in the row direction, and is configured to input a pixel signal to the signal conversion unit 40 for each column.

The conversion unit 40 performs digital conversion on an analog signal which is output by the pixel unit 110. The conversion unit 40 of the present example converts an analog pixel signal into a digital signal. The conversion unit 40 sequentially performs digital conversion on analog signals from the m pixels 112 arrayed in the column direction. The conversion unit 40 performs digital conversion on analog signals in parallel from the pixels 112 aligned in n columns in the row direction. This may also be regarded as a column ADC system for the single pixel block 120.

The signal output unit 50 receives a digital signal from the conversion unit 40. In an example, the signal output unit 50 is configured to temporarily store the digital signal. The signal output unit 50 may have a latch circuit configured to store the digital signal.

A local I/O 70 is an interface which controls input/output of a signal of the control block 220. In an example, the local I/O 70 outputs a digital pixel signal temporarily stored in the signal output unit 50 to the image processing unit 310 through a through electrode 62 which will be described below.

The through electrode region 60 has the through electrode 62 and a prohibition region 61 thereof. The through electrode 62 is also referred to as a TSV. The through electrode 62 is electrically connected to the image processing unit 310 of the third substrate 300, and forms part of a channel for outputting a signal to the image processing unit 310. The prohibition region 61 is provided so as to be adjacent to the through electrode 62, and is a region where an element other than the through electrode 62 (for example, a transistor or the like) is not arranged. A region where the through electrode 62 is provided may be referred to as a first region, and the prohibition region 61 may be referred to as a second region.

A bold line in the drawing represents a well separation band 72. The well separation band 72 is provided such that adjacent circuits are electrically separated from each other more reliably because voltage magnitudes or the like to be dealt with are different between the adjacent circuits. As an additional remark, the well separation band 72 may be provided between a circuit which deals with an analog signal and a circuit which deals with a digital signal. In the example of FIG. 5, the pixel drive unit 20, the linking unit 30, and the conversion unit 40 mainly deal with an analog signal, and the signal output unit 50, the local I/O 70, and the through electrode region 60 mainly deal with a digital signal.

In the control block 220 of FIG. 5, the pixel drive unit 20 is arranged so as to be vertically long from an upper edge to a lower edge along a left edge. The linking unit 30 and the conversion unit 40 are arranged in the stated order from the upper edge towards a lower side while sandwiching the well separation band 72 on a right side of the pixel drive unit 20. The signal output unit 50 is arranged on a lower side of the conversion unit 40 while sandwiching the well separation band 72, and the local I/O 70 and the through electrode region 60 are arranged on a lower right of the signal output unit 50. The through electrode 62 of the through electrode region 60 is arranged in a lower right corner in the control block 220, and its upper and left regions are covered by the prohibition region 61.

Note that instead of the configuration where the single control block 220 is provided for the single pixel block 120, a single control block may be provided for N (N is a natural number more than or equal to 2) pixel blocks 120. The N pixel blocks 120 corresponding to the single pixel block may be referred to as a pixel block group. For example, two pixel blocks 120 arranged to be aligned along the column direction may be set as a single pixel block group, and a single control block 220 may be provided. In this case, the control block 220 may control an exposure time for each of the pixel blocks 120.

As an additional remark, the control block 220 is electrically connected to at least one pixel block 120, and it can also be stated that the control block 220 is a minimum unit of a circuit which controls the pixel 112 of the at least one pixel block 120.

Figure 6:
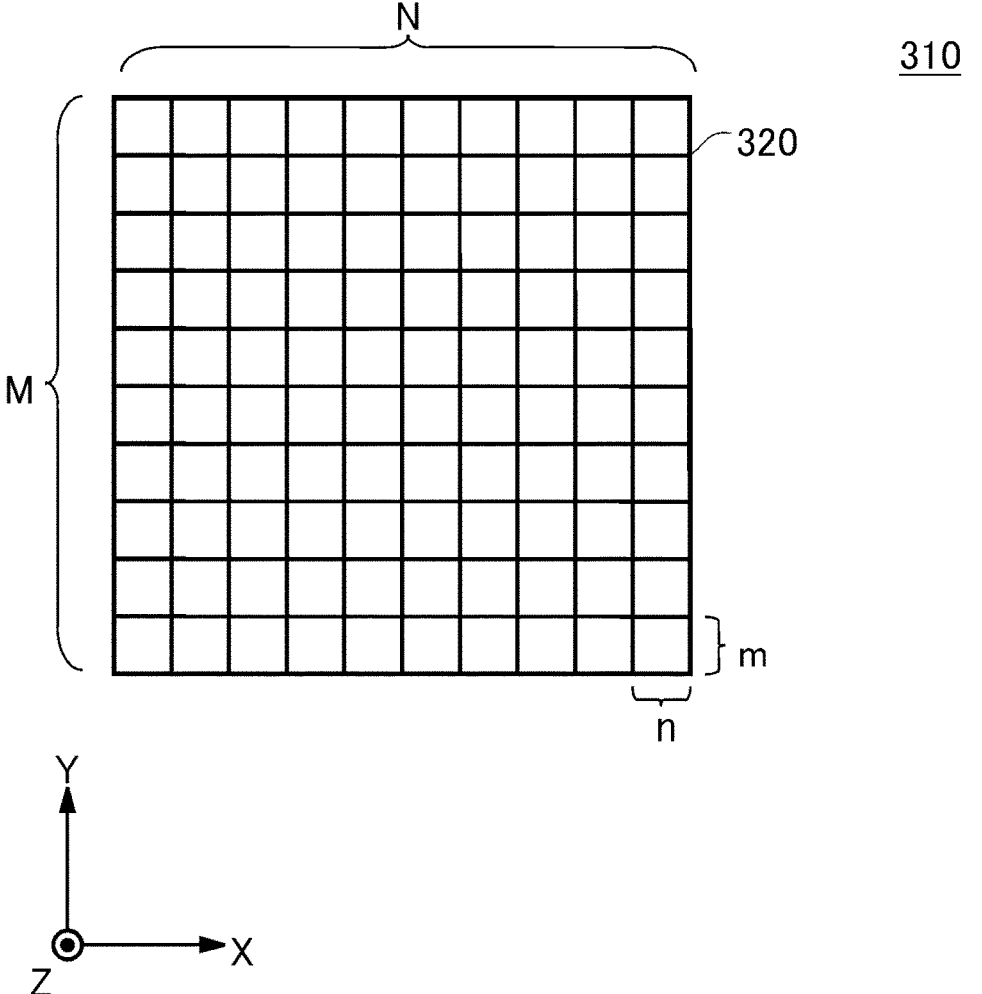
FIG. 6 illustrates an example of a more specific configuration of an image processing unit 310.

FIG. 6 illustrates an example of a more specific configuration of the image processing unit 310. The image processing unit 310 has processing blocks 320 arranged to be aligned in the row direction and the column direction. The image processing unit 310 of the present example has M×N processing blocks 320.

The processing blocks 320 are respectively arranged in positions corresponding to the control blocks 220. For example, the processing block 320 and the control block 220 are arranged at overlapped positions as viewed from a stacking direction of the second substrate 200 and the third substrate 300. In this case, an area of the processing block 320 and an area of the control block 220 may be substantially the same with a margin between the adjacent blocks included.

Figure 7:
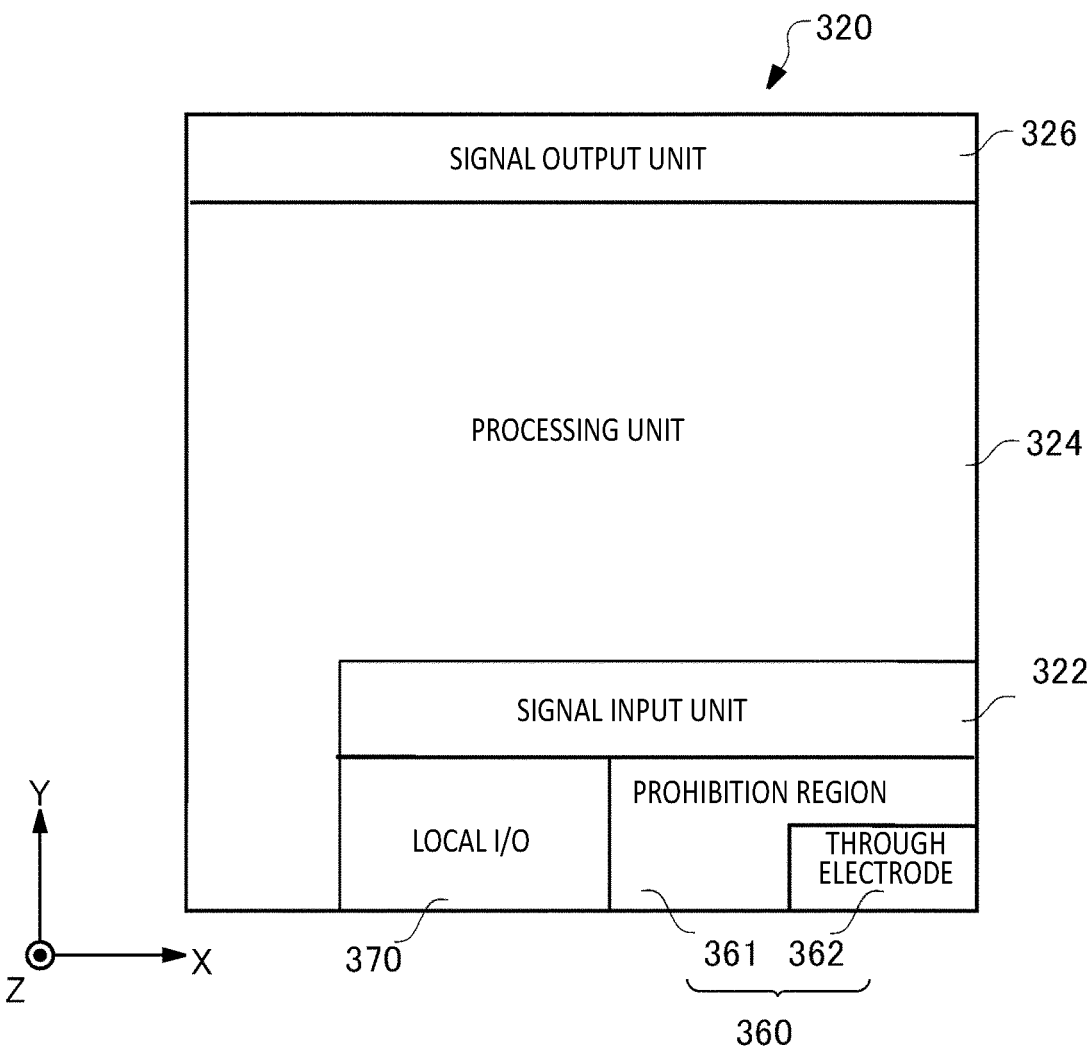
FIG. 7 illustrates an example of a more specific configuration of a processing block 320.

FIG. 7 illustrates an example of a more specific configuration of the processing block 320. The processing block 320 performs image processing on a pixel signal converted to be digital in the corresponding control block 220. For example, the processing block 320 performs image processing such as data complement or compression on a pixel signal which is output in the control block 220. As an additional remark, for example, the image processing such as the compression decreases an amount of data of a pixel signal which is output to the through electrode 62. The processing block 320 of the present example includes a local I/O 370, a through electrode region 360, a signal input unit 322, a processing unit 324, and a signal output unit 326.

The local I/O 370 is an interface which controls input/output of a signal of the processing block 320. In an example, the local I/O 370 receives a digital pixel signal as an input from the control block 220 through a through electrode 362 which will be described below.

The through electrode region 360 has the through electrode 362 and a prohibition region 361 thereof. The through electrode region 360, the through electrode 362, and the prohibition region 361 are the same as the through electrode region 60, the through electrode 62, and the prohibition region 61 of the control block 220, and descriptions thereof are not repeated.

The signal input unit 322 receives a digital signal from the control block 220 via the through electrodes 62 and 362. In an example, the signal input unit 322 temporarily stores the digital signal. The signal input unit 322 may have a latch circuit configured to store the digital signal.

The processing unit 324 performs image processing on the digital signal temporarily stored in the signal input unit 322. For example, the processing unit 324 performs image processing such as data complement or compression on the pixel signal which is output in the control block 220 and stored in the signal input unit 322. The processing unit 324 outputs the signal on which the image processing has been performed to the signal output unit 326.

The signal output unit 326 receives the signal from the processing unit 324 and temporarily stores the signal. The signal output unit 326 may have a latch circuit configured to store a digital signal. The signal output unit 326 further outputs the temporarily stored signal to the outside of the processing block 320.

In the example of FIG. 7, the through electrode 362 and the prohibition region 361 are provided at positions corresponding to the through electrode 362 and the prohibition region 361 of the corresponding control block 220. For example, the through electrodes 62 and 362 are arranged at overlapped positions as viewed from the stacking direction of the second substrate 200 and the third substrate 300. Furthermore, for example, the prohibition regions 61 and 361 are arranged at overlapped positions as viewed from the stacking direction of the second substrate 200 and the third substrate 300. As an additional remark, it can also be mentioned that the through electrode regions 60 and 360 are arranged at overlapped positions as viewed from the stacking direction of the second substrate 200 and the third substrate 300.

Note that in the example of FIG. 7, the signal input unit 322 and the local I/O 370 are also arranged at positions corresponding to the signal output unit 50 and the local I/O 70 of the corresponding control block 220. However, a configuration may also be adopted where these are not arranged at the corresponding positions.

Figure 8:
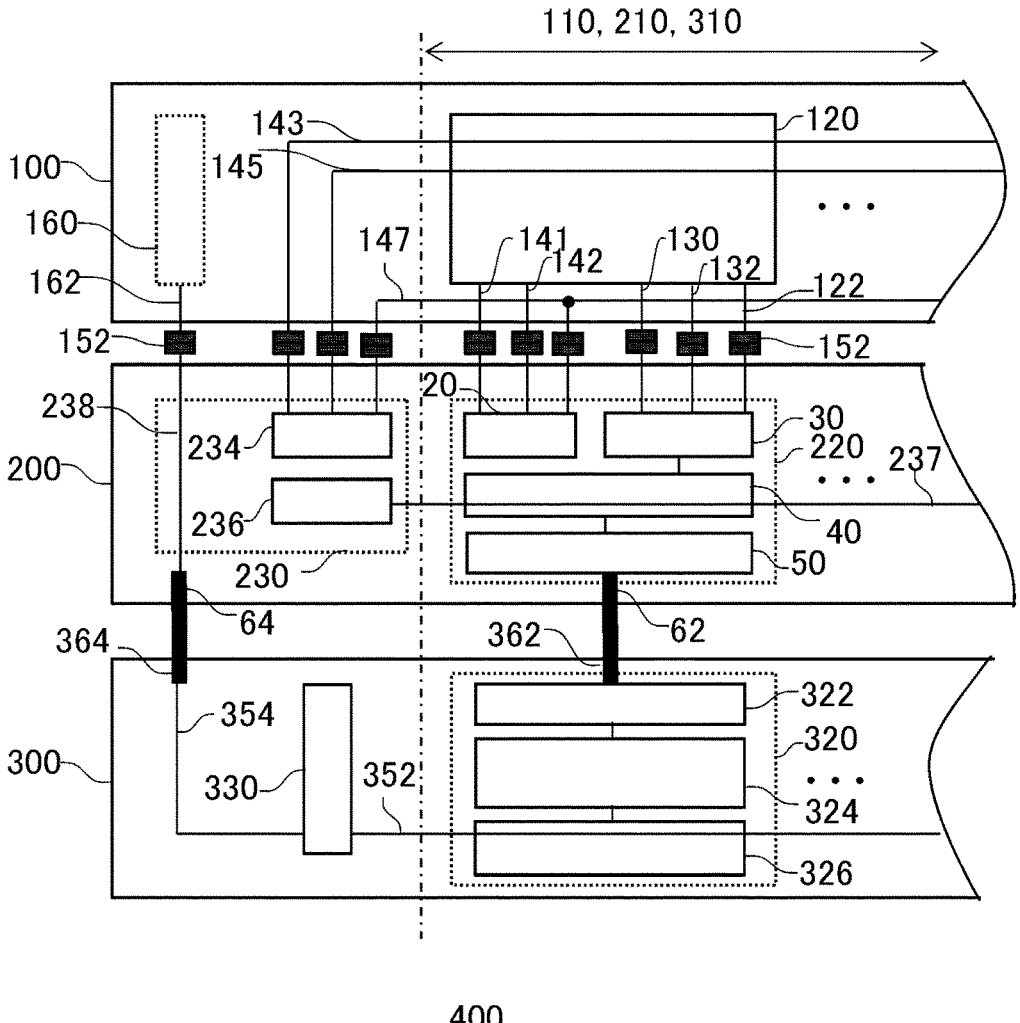
FIG. 8 is a diagram for describing an example of a wiring method of the image capturing element 400.

FIG. 8 is a diagram for describing an example of a wiring method of the image capturing element 400. Herein, the peripheral circuit unit 230 of the second substrate 200 has a global drive unit 234 and an ADC setting unit 236.

The global drive unit 234 is connected to a reset control line 143 and a selection control line 145 through which signals are output to the respective pixel blocks 120. The global drive unit 234 supplies a plurality of pixel blocks 120 with the reset control signal φRST via the reset control line 143 and with the selection control signal φSEL via the selection control line 145. The global drive unit 234 supplies a plurality of control blocks 220 with a transfer selection control signal φTXSEL via a transfer selection control line 147.

The transfer selection control signal φTXSEL is supplied to the control block 220 from the global drive unit 234 to control an exposure time for each of the pixel blocks 120. The control block 220 supplied with the transfer selection control signal φTXSEL is configured to output the transfer selection control signal φTXSEL to the corresponding pixel block 120. The pixel block 120 decides whether the transfer selection control signal φTXSEL is to be input to the pixel 112 as the transfer control signal φTX1 or the discharge control signal φTX2. Wit is this configuration, the input of the transfer control signal φTX1 or the discharge control signal φTX2 to the pixel 112 is skipped.

For example, when the finishing time of the exposure is decided by the transfer control signal φTX1, the control block 220 extends the exposure time by causing the transfer control signal φTX1 to skip. In addition, when the starting time of the exposure is decided by the transfer control signal φTX1, the control block 220 can shorten the exposure time by causing the transfer control signal φTX1 to skip. In this manner, the exposure time of the pixel block 120 can be adjusted by the transfer selection control signal φTXSEL. The same also applies to a case where a starting time or a finishing time of the exposure is decided by the discharge control signal φTX2.

The reset control line 143, the selection control line 145, and the transfer selection control line 147 are globally wired, that is, are commonly provided to a plurality of pixel blocks 120. The reset control line 143, the selection control line 145, and the transfer selection control line 147 of the present example are wired so as to traverse the pixel unit 110 in the row direction. The reset control line 143, the selection control line 145, and the transfer selection control line 147 may be wired so as to traverse the pixel unit 110 in the column direction.

For example, the reset control line 143 is connected to the gate terminal of the reset unit 126 of the pixel block 120 to supply the reset control signal (PST. The selection control line 145 is connected to the gate terminal of the selection unit 129 of the pixel block 120 to supply the selection control signal φSEL. In addition, the transfer selection control line 147 is connected to each of the plurality of control blocks 220 to supply the transfer selection control signal φTXSEL to the pixel drive unit 20.

Note that the global drive unit 234 of the present example outputs the transfer selection control signal φTXSEL from the second substrate 200 to the first substrate 100, but may output the transfer selection control signal φTXSEL to the control block 220 without the supply to the first substrate 100. In this case, the transfer selection control line 147 is provided to the second substrate 200.

The ADC setting unit 236 is connected to the conversion units 40 of the plurality of control blocks 220 by a common signal line 237. The signal line 237 can also be regarded as a global signal line. The ADC setting unit 236 sets a gain, an offset, a settling down time, a resolution, and the like in the conversion unit 40.

On the other hand, a transfer control line 141 and a discharge control line 142 that are local control lines from the pixel drive unit 20 of the control block 220 are connected to the pixel block 120. The transfer control line 141 of the present example is connected to a gate terminal of the transfer unit 123 provided to the pixel block 120. The transfer control signal φTX1 output from the pixel drive unit 20 is supplied to the pixel block 120 through the transfer control line 141. The discharge control line 142 of the present example is connected to the gate terminal of the discharge unit 124 provided to the pixel block 120. The discharge control signal φTX2 output from the pixel drive unit 20 is supplied to the pixel block 120 through the discharge control line 142.

The linking unit 30 is connected to the signal line 122 and a power supply line 130. The linking unit 30 is connected to a ground line 132 set at a reference potential VGND. The linking unit 30 outputs the pixel signal to the correspondingly provided conversion unit 40. For example, the n conversion units 40 are provided in the row direction.

The ground line 132 is set at the predetermined reference potential VGND. The ground line 132 of the present example is wired so as to traverse the first substrate 100 in the row direction.

A plurality of bumps 152 is provided to a linking surface where the first substrate 100 and the second substrate 200 are linked to each other. A bump 152 of the first substrate 100 is positioned to match a bump 152 of the second substrate 200. A plurality of opposite bumps 152 is linked by a pressure treatment or the like of the first substrate 100 and the second substrate 200 to be electrically connected.

The image capturing element 400 of the present example controls the exposure time for each of the pixel blocks 120 by changing a timing of at least one of the transfer unit 123 or the discharge unit 124 by a local control line. The image capturing element 400 can achieve control of the exposure time by a still fewer control lines through a combination of a local control line and a global control line.

Furthermore, the signal output unit 50 of the control block 220 is connected to the signal input unit 322 of the corresponding processing block 320 by the through electrodes 62 and 362. With this configuration, a signal is transmitted and received between the control block 220 and the processing block 320.

The peripheral circuit unit 330 arranged in the third substrate 300 is connected to a plurality of processing blocks 320 by a global signal line 352. The peripheral circuit unit 330 reads the pixel signal on which the image processing has been performed from each of the plurality of processing blocks 320, for example. The peripheral circuit unit 330 further outputs the read pixel signal to an I/O unit 160 of the first substrate 100 via a signal line 354, through electrodes 364 and 64, a signal line 238, the bump 152, and a signal line 162.

As an additional remark, the second substrate 200 and the third substrate 300 are electrically linked by the through electrodes 62, 64, 362, and 364. The linking may be further reinforced physically.

Figure 9:
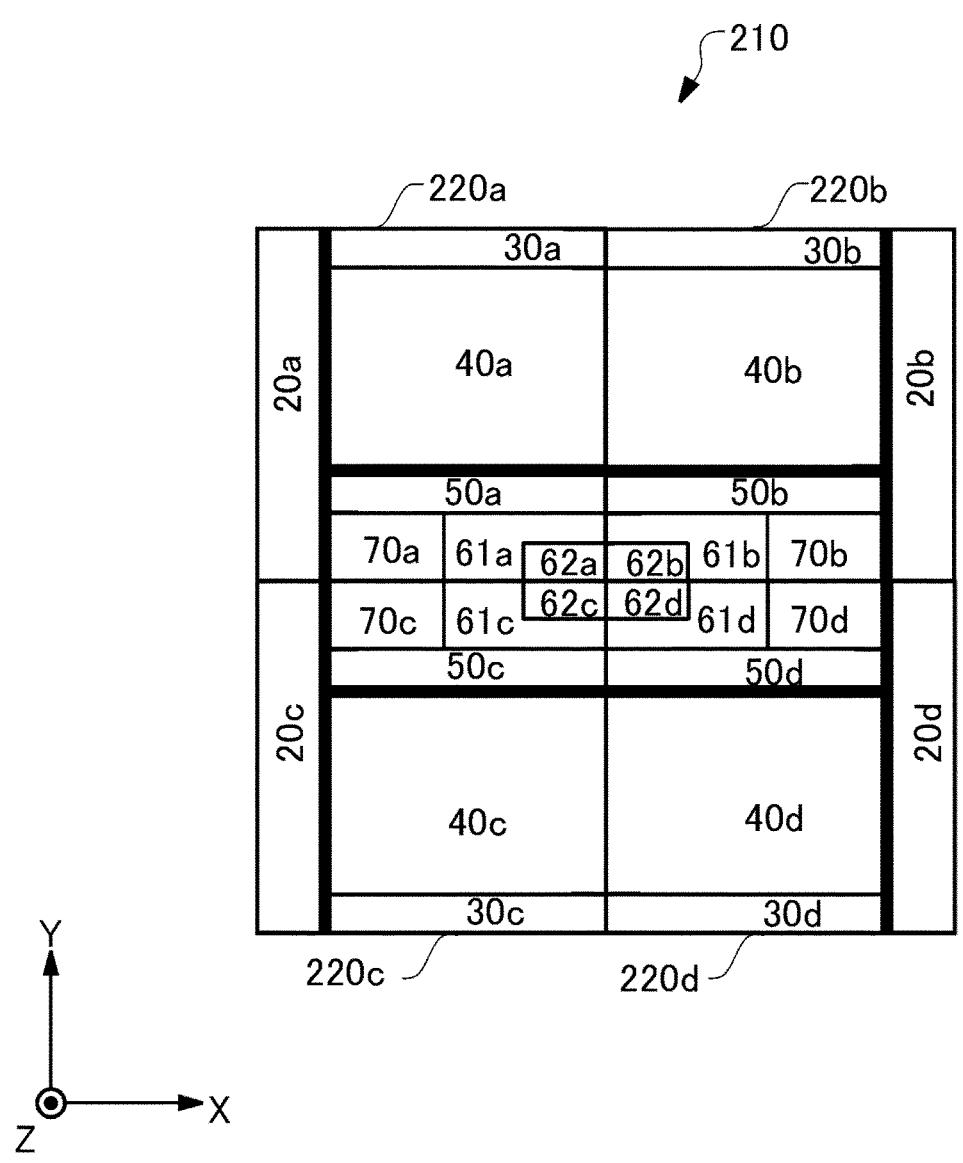
FIG. 9 is a schematic view illustrating an arrangement relationship of a plurality of control blocks 220.

FIG. 9 is a schematic view illustrating an arrangement relationship of a plurality of control blocks 220. In the example of FIG. 9, mutually adjacent four control blocks 220a, 220b, 220c, and 220d are illustrated.

In the example of FIG. 9, through electrodes 62a, 62b, 62c, and 62d are arranged in a center of a whole of the four control blocks 220a, 220b, 220c, and 220d. With this configuration, prohibition regions 61a, 61b, 61c, and 61d are arranged so as to surround the through electrodes 62a, 62b, 62c, and 62d.

This can also be mentioned that through electrode regions of the four control blocks 220a, 220b, 220c, and 220d are adjacent to each other. In accordance with this arrangement, as compared to a case where each through electrode is arranged to be away from each other, the through electrode regions can be made smaller as a whole.

Furthermore, in the example of FIG. 9, the respective circuits of the control blocks 220a and 220b which are adjacent in an X direction are arranged to be horizontally symmetrical. For example, a conversion unit 40a of the control block 220a and a conversion unit 40b of the control block 220b adjacent to the control block 220a with regard to the X direction are adjacent to each other in the X direction. In addition, the respective circuits of the control blocks 220a and 220c which are adjacent in a Y direction are arranged to be vertically symmetric. For example, the through electrode region (that is, the through electrode 62a and the prohibition region 61a) of the control block 220a and the through electrode region (that is, the through electrode 62c and the prohibition region 61*c*) of the control block 220*c* adjacent to the control block 220*a* with regard to the Y direction are arranged between the conversion unit 40*a* of the control block 220*a* and the conversion unit 40*c* of the control block 220*c* in the Y direction. It is noted however that it suffices when the arrangement of the circuits is symmetrical, and wirings in the circuits, directions of signal flows, input/output orders, and the like do not necessarily need to be symmetrical.

With this configuration, since the circuits having a similar function are adjacent to each other between the adjacent control blocks 220, it is possible to omit the well separation band to increase an area efficiency.

While these four control blocks 220*a*, 220*b*, 220*c*, and 220*d* are set as a unit, the control blocks 220 are repeatedly arranged using similar arrangements in the X direction and the Y direction. This repeating unit may be referred to as a unit circuit group.

Between the control blocks 220 across the repeating unit, that is, adjacent between the unit circuit groups, the mutual through electrode regions 60 are separated by a region where another element is provided. For example, a control block having a same arrangement as the control block 220*a* is adjacent on a +X side of the control block 220*b* in FIG. 9. The mutual through electrode regions are not adjacent between these, and a region provided with another element such as a local I/O or a pixel drive unit exists therebetween.

Figure 10:
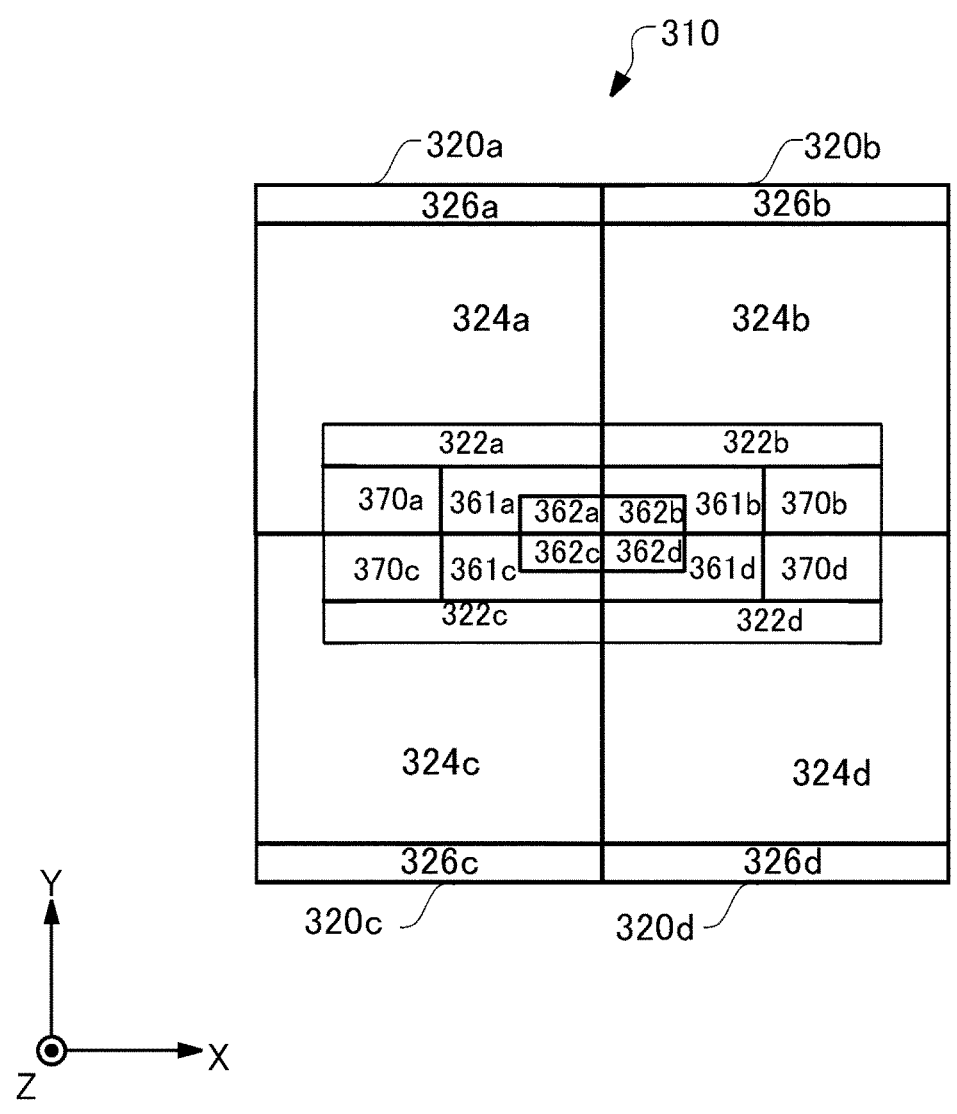
FIG. 10 is a schematic view illustrating an arrangement relationship of a plurality of processing blocks 320.

FIG. 10 is a schematic view illustrating an arrangement relationship of a plurality of processing blocks 320. In the example of FIG. 10, mutually adjacent four processing blocks 320*a*, 320*b*, 320*c*, and 320*d* corresponding to the mutually adjacent four control blocks 220*a*, 220*b*, 220*c*, and 220*d* of FIG. 9 are illustrated.

In the example of FIG. 10 too, through electrode 362*a*, 362*b*, 362*c*, and 362*d* are arranged in a center of a whole of the four processing blocks 320*a*, 320*b*, 320*c*, and 320*d*. With this configuration, the prohibition regions 361*a*, 361*b*, 361*c*, and 361*d* are arranged so as to surround the through electrodes 362*a*, 362*b*, 362*c*, and 362*d*.

This can also be mentioned that through electrode regions of the four processing blocks 320*a*, 320*b*, 320*c*, and 320*d* are adjacent to each other. In accordance with this arrangement, as compared to a case where each through electrode is arranged to be away from each other, the through electrode regions can be made smaller as a whole.

Furthermore, in the example of FIG. 10, the respective circuits of the processing blocks 320*a* and 320*b* which are adjacent in an X direction are arranged to be horizontally symmetrical. For example, a processing unit 324*a* of the processing block 320*a* and a processing unit 324*b* of the processing block 320*b* adjacent to the processing block 320*a* with regard to the X direction are adjacent to each other in the X direction. In addition, the respective circuits of the processing blocks 320*a* and 320*c* which are adjacent in the Y direction are arranged to be vertically symmetric. It is noted however that it suffices when the arrangement of the circuits is symmetrical, and wirings in the circuits, directions of signal flows, input/output orders, and the like do not necessarily need to be symmetrical. While these four processing blocks 320*a*, 320*b*, 320*c*, and 320*d* are set as a unit, the processing blocks 320 are repeatedly arranged using similar arrangements in the X direction and the Y direction.

Figure 11:
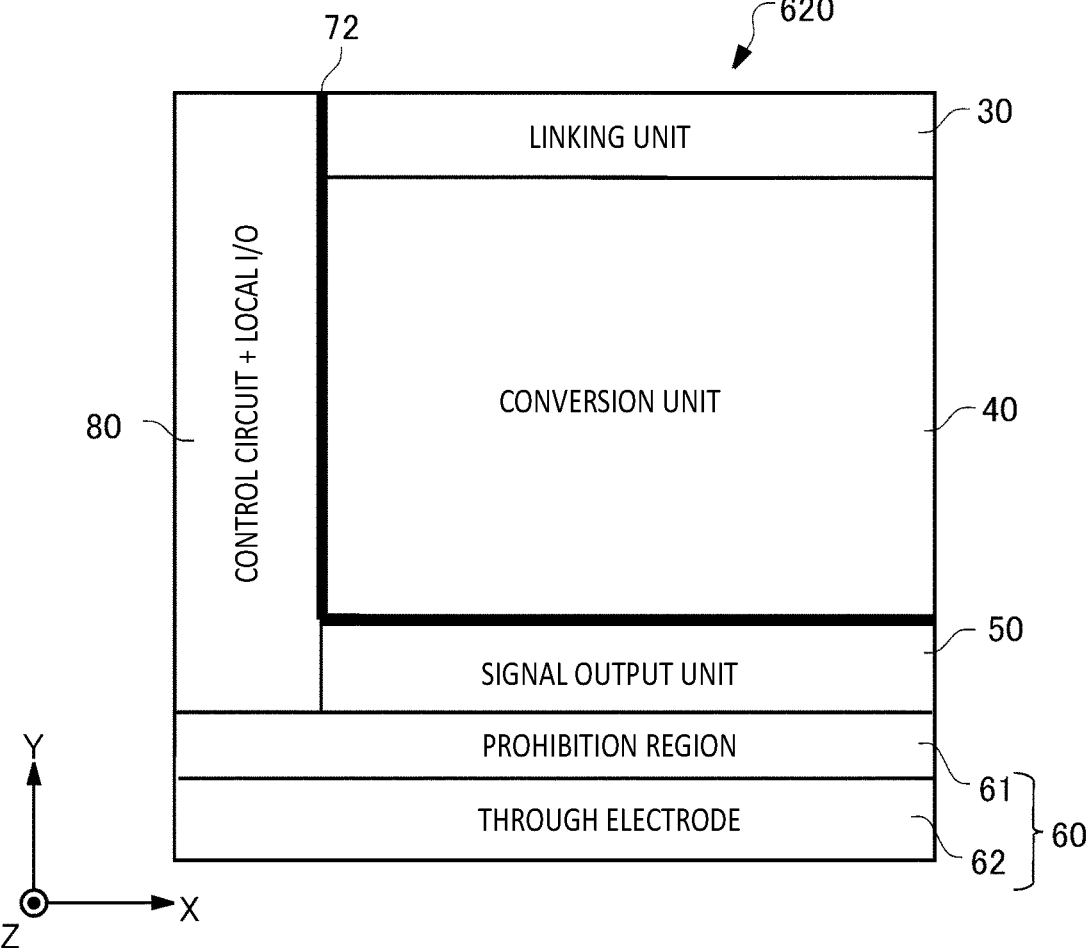
FIG. 11 illustrates an example of a specific configuration of another control block 620.

FIG. 11 illustrates an example of a specific configuration of another control block 620. A same configuration as the control block 220 of FIG. 5 in the control block 620 is assigned with a same reference numeral, and a description thereof is not repeated.

In the control block 620, a control circuit 80 is provided instead of the pixel drive unit 20 of the control block 220. The control circuit 80 mainly controls the control block 620. A function similar to the local I/O 70 of the control block 220 is also provided in a region of the control circuit 80.

In the control block 620 of FIG. 11, the control circuit 80 is arranged so as to be vertically long from an upper edge along a left edge. The linking unit 30 and the conversion unit 40 are arranged in the stated order from the upper edge towards a −Y side while sandwiching the well separation band 72 on a +X side of the control circuit 80. The signal output unit 50 is arranged on a lower side of the conversion unit 40 while sandwiching the well separation band 72, and the through electrode region 60 is arranged from a right edge to the left edge along the lower edge on a lower side of the signal output unit 50 and the control circuit 80. The through electrode 62 of the through electrode region 60 is arranged along the lower edge of the control block 620, and its upper region is covered by the prohibition region 61.

Figure 12:
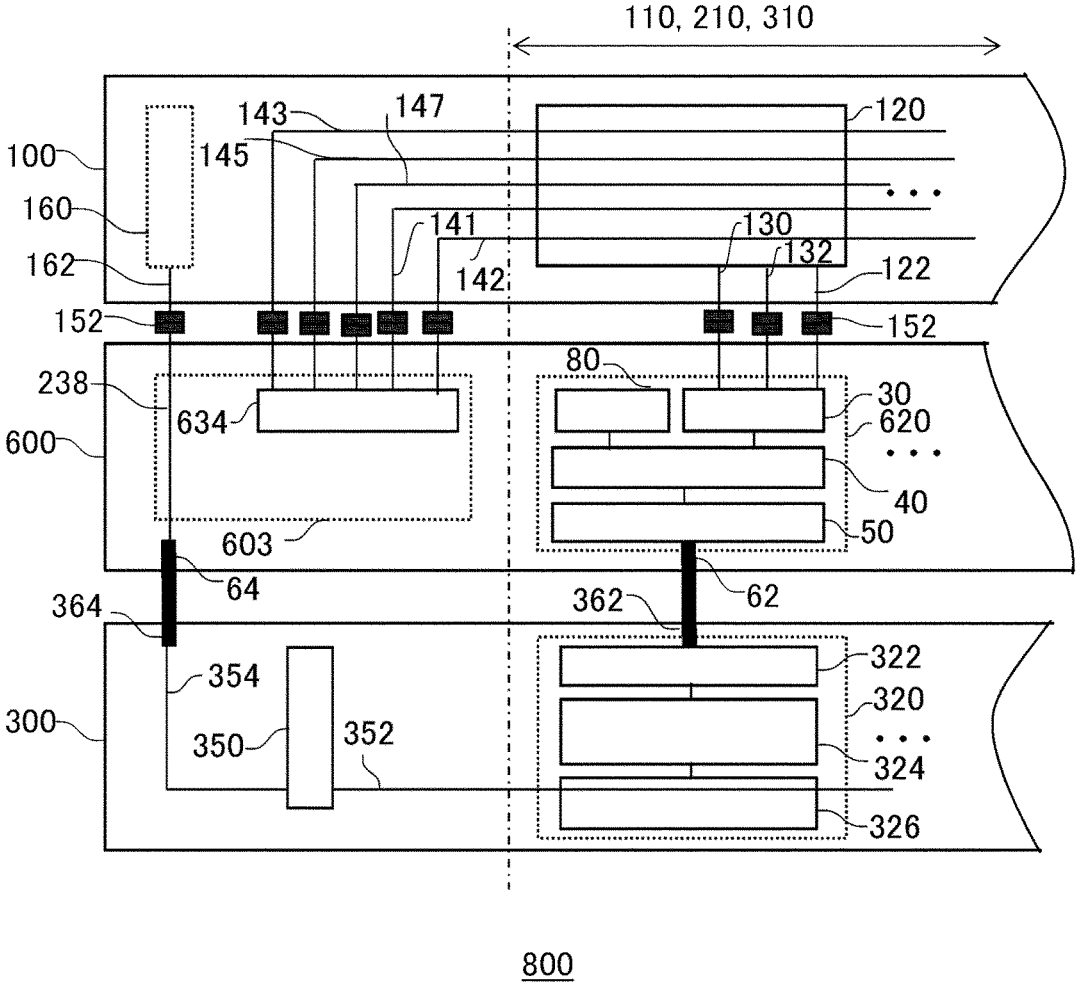
FIG. 12 is a diagram for describing an example of a wiring method of an image capturing element 800 using the control block 620.

FIG. 12 is a diagram for describing an example of a wiring method of an image capturing element 800 using the control block 620. In the image capturing element 800 of FIG. 12, a same configuration as that of FIG. 8 is assigned with a same reference numeral, and a description thereof is not repeated.

In the image capturing element 800, a peripheral circuit unit 603 has a global drive unit 634. In addition to the function of the global drive unit 234 of FIG. 8, the global drive unit 634 supplies the transfer control signal φTX1 and the discharge control signal φTX2 to the pixel block 120 by the transfer control line 141 and the discharge control line 142. Herein, the transfer control line 141 and the discharge control line 142 are global wirings commonly connected to a plurality of pixel blocks 120. Accordingly, exposure control is globally performed in the entirety of the pixel unit 110.

On the other hand, in the image capturing element 800, the peripheral circuit unit 603 does not have the ADC setting unit 236 of the peripheral circuit unit 230. Instead, the control circuit 80 is provided to each of the control blocks 620. This control circuit 80 also has a function of the ADC setting unit 236. With this configuration, in the image capturing element 800, it is possible to set the gain, the offset, the settling down time, the resolution, and the like in the conversion unit 40 for each of the control blocks 620.

Figure 13:
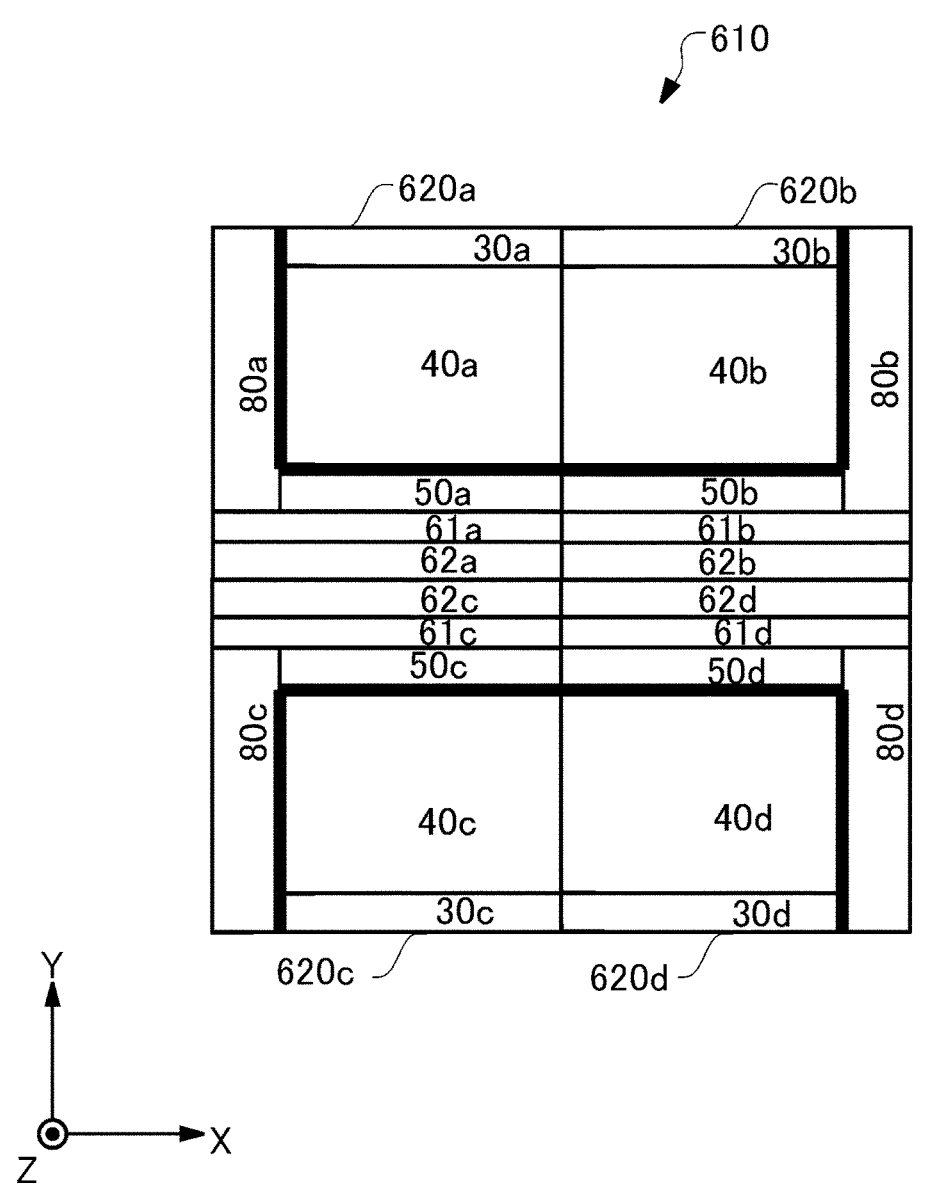
FIG. 13 is a schematic view illustrating an arrangement relationship of a plurality of control blocks 620.

FIG. 13 is a schematic view illustrating an arrangement relationship of a plurality of control blocks 620. In the example of FIG. 13, mutually adjacent four control blocks 620*a*, 620*b*, 620*c*, and 620*d* are illustrated.

In the example of FIG. 13 too, the through electrodes 62*a*, 62*b*, 62*c*, and 62*d* are arranged in a center of a whole of the four control blocks 620*a*, 620*b*, 620*c*, and 620*d*. With this configuration, the prohibition regions 61*a*, 61*b*, 61*c*, and 61*d* are arranged so as to surround the through electrodes 62*a*, 62*b*, 62*c*, and 62*d*.

This can also be mentioned that through electrode regions of the four control blocks 620*a*, 620*b*, 620*c*, and 620*d* are adjacent to each other. In accordance with this arrangement, as compared to a case where each through electrode is arranged to be away from each other, the through electrode regions can be made smaller as a whole.

Furthermore, in the example of FIG. 13, the respective circuits of the control blocks 620*a* and 620*b* which are adjacent in an X direction are arranged to be horizontally symmetrical. In addition, the respective circuits of the control blocks 620*a* and 620*c* which are adjacent in the Y direction are arranged to be vertically symmetric. It is noted however that it suffices when the arrangement of the circuits is symmetrical, and wirings in the circuits, directions of signal flows, input/output orders, and the like do not necessarily need to be symmetrical. With this configuration, since the circuits having a similar function are adjacent to each other between the adjacent control blocks 620, it is possible to omit the well separation band to increase the area efficiency.

While these four control blocks 620a, 620b, 620c, and 620d are set as a unit, the control blocks 620 are repeatedly arranged using similar arrangements in the X direction and the Y direction to configure a control circuit unit 610. Note that in this case, between the control blocks 620 adjacent in the X direction across the repeating unit, the mutual through electrode regions 60 are adjacent. For example, a control block having a same arrangement as the control block 620a is adjacent on a right side of the control block 620b in FIG. 13. Between these too, the mutual through electrode regions are adjacent. With this configuration, the area efficiency can be further increased.

Figure 14:
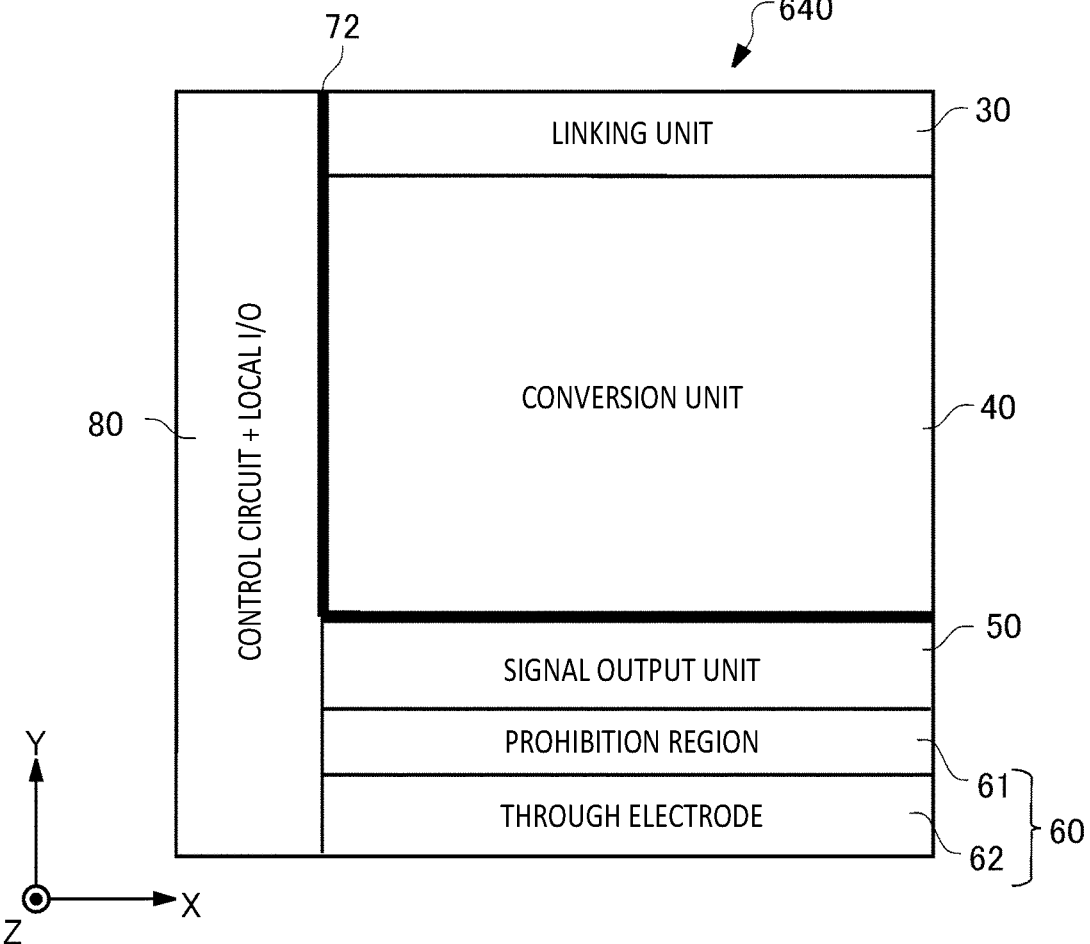
FIG. 14 illustrates an example of a specific configuration of still another control block 640.

FIG. 14 illustrates an example of a specific configuration of still another control block 640. A same configuration as the control block 620 of FIG. 11 in the control block 640 is assigned with a same reference numeral, and a description thereof is not repeated. The control block 640 is different from the control block 620 in that the control circuit 80 extends from the upper edge to the lower edge of the control block 640.

Figure 15:
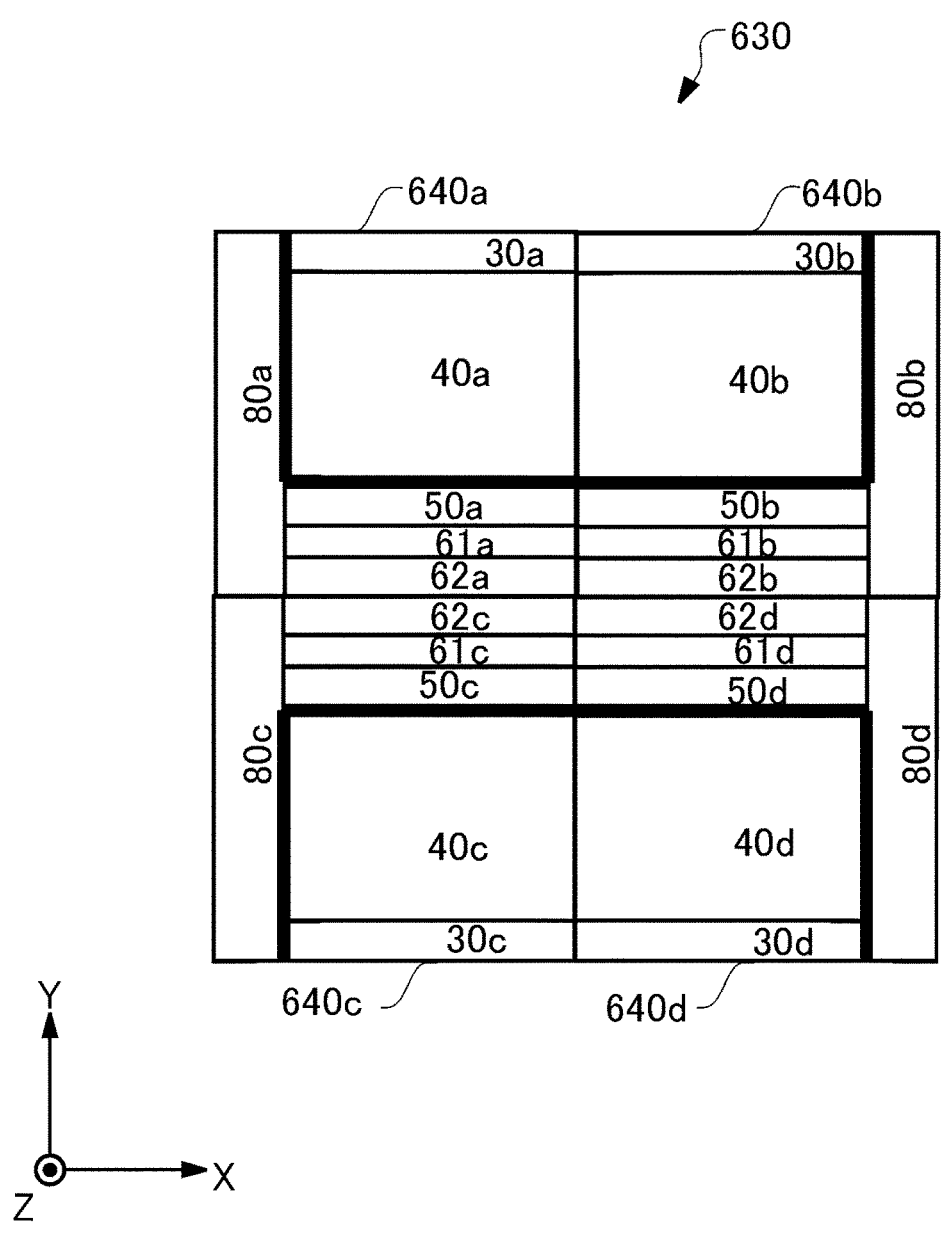
FIG. 15 is a schematic view illustrating an arrangement relationship of a plurality of control blocks 640.

FIG. 15 is a schematic view illustrating an arrangement relationship of a plurality of control blocks 640. In the example of FIG. 15, mutually adjacent four control blocks 640a, 640b, 640c, and 640d are illustrated.

In the example of FIG. 15 too, the through electrodes 62a, 62b, 62c, and 62d are arranged in a center of a whole of the four control blocks 640a, 640b, 640c, and 640d. With this configuration, the prohibition regions 61a, 61b, 61c, and 61d are arranged so as to surround the through electrodes 62a, 62b, 62c, and 62d.

This can also be mentioned that through electrode regions of the four control blocks 640a, 640b, 640c, and 640d are adjacent to each other. In accordance with this arrangement, as compared to a case where each through electrode is arranged to be away from each other, the through electrode regions can be made smaller as a whole.

Furthermore, in the example of FIG. 15, the respective circuits of the control blocks 640a and 640b which are adjacent in an X direction are arranged to be horizontally symmetrical to configure the control circuit unit 610. In addition, the respective circuits of the control blocks 640a and 640c which are adjacent in the Y direction are arranged to be vertically symmetric. It is noted however that it suffices when the arrangement of the circuits is symmetrical, and wirings in the circuits, directions of signal flows, input/output orders, and the like do not necessarily need to be symmetrical. With this configuration, since the circuits having a similar function are adjacent to each other between the adjacent control blocks 640, it is possible to omit the well separation band to increase the area efficiency.

While these four control blocks 640a, 640b, 640c, and 640d are set as a unit, the control blocks 640 are repeatedly arranged using similar arrangements in the X direction and the Y direction to configure a control circuit unit 630. Note that between the adjacent control blocks 640 across the repeating unit, the mutual through electrode regions 60 are separated by the control circuit 80. On the other hand, the control circuits 80 of the four control blocks 640 mutually adjacent up and down are to be mutually adjacent. Thus, it can also be mentioned that a degree of freedom for designing the control circuit 80 is increased.

Figure 16:
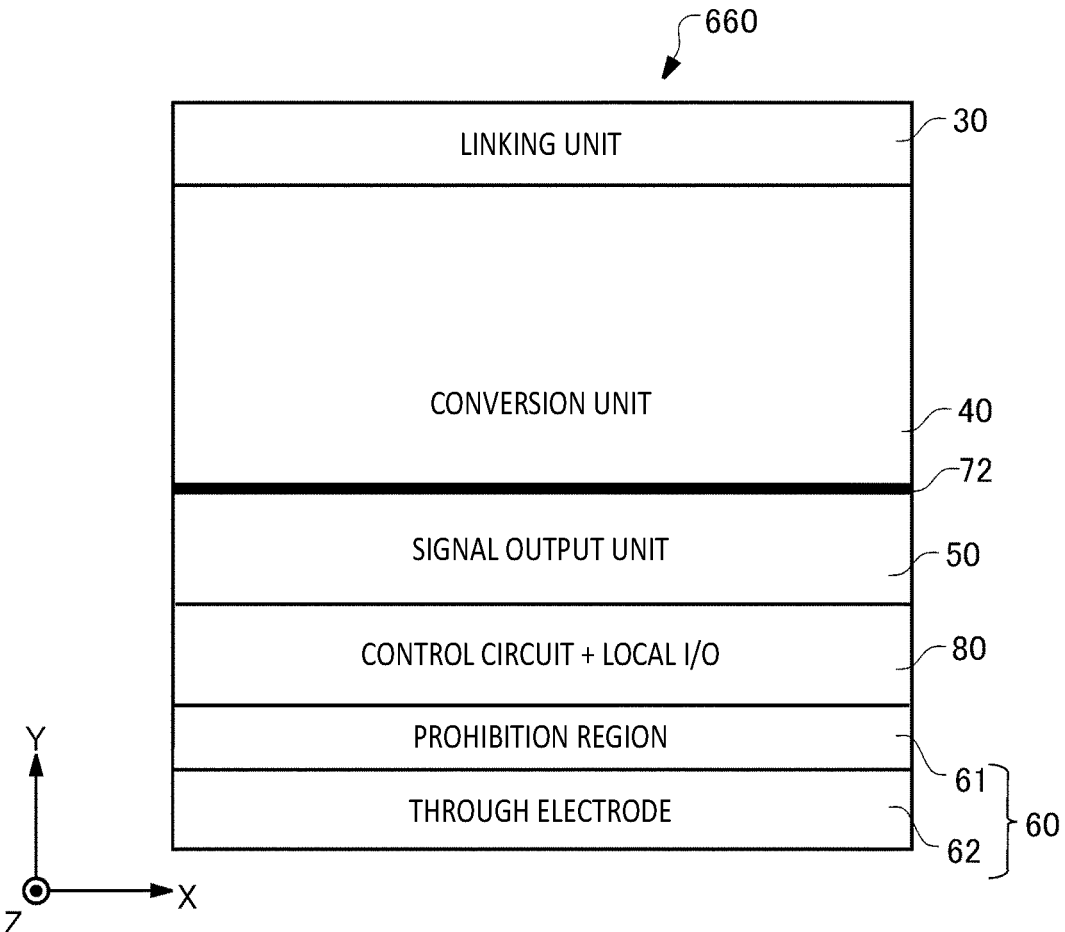
FIG. 16 illustrates an example of a specific configuration of still another control block 660.

FIG. 16 illustrates an example of a specific configuration of still another control block 660. A same configuration as the control block 620 of FIG. 11 in the control block 660 is assigned with a same reference numeral, and a description thereof is not repeated.

In the control block 660, the linking unit 30, the conversion unit 40, the well separation band 72, the control circuit 80, and the through electrode region 60 are arranged in the stated order from the upper edge to the lower edge, and these extend from the left edge to the right edge. In addition, the through electrode 62 of the through electrode region 60 extends from the left edge to the right edge along the lower edge of the control block 620, and its upper region is covered by the prohibition region 61.

Figure 17:
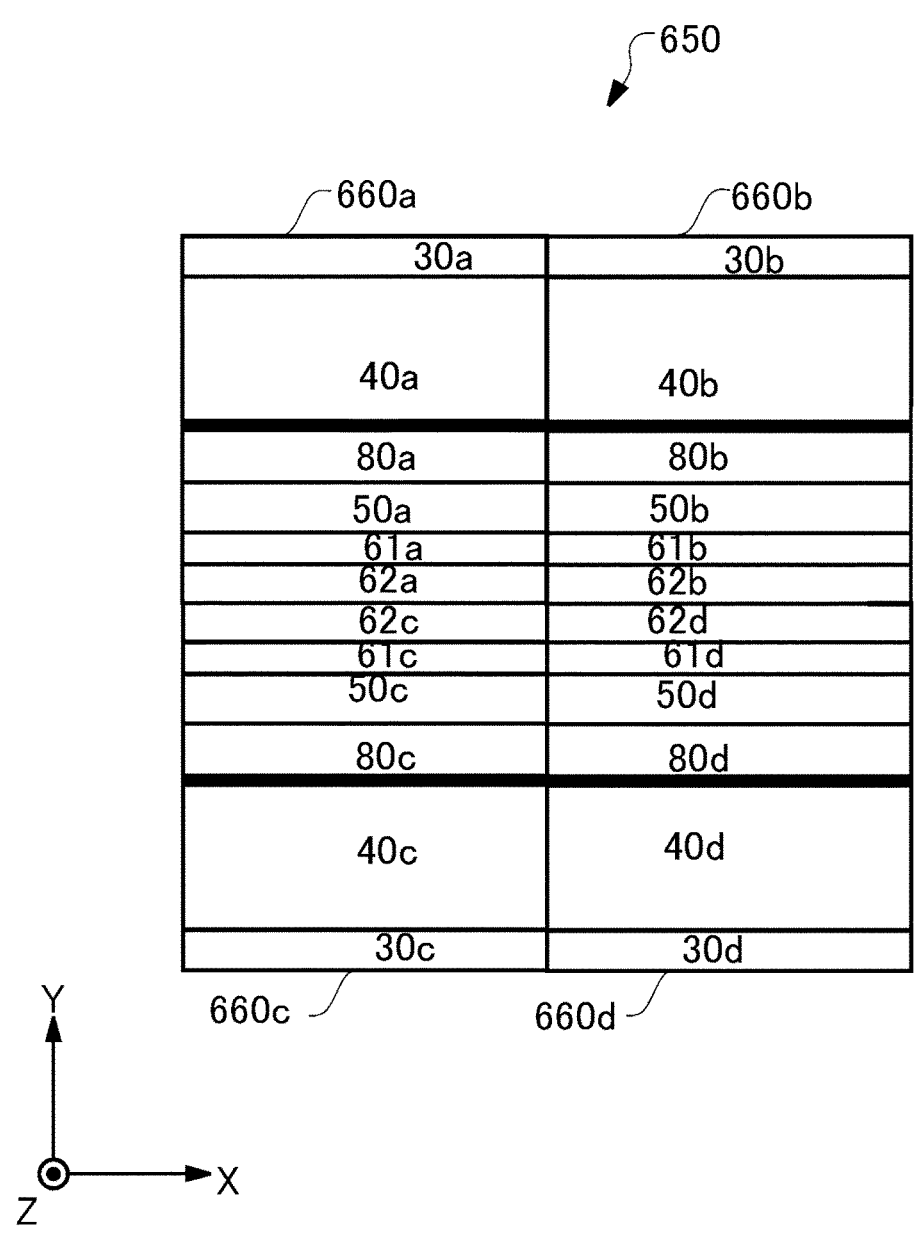
FIG. 17 is a schematic view illustrating an arrangement relationship of a plurality of control blocks 660.

FIG. 17 is a schematic view illustrating an arrangement relationship of a plurality of control blocks 660. In the example of FIG. 17, mutually adjacent four control blocks 660a, 660b, 660c, and 660d are illustrated.

In the example of FIG. 17 too, the through electrodes 62a, 62b, 62c, and 62d are arranged in a center of a whole of the four control blocks 660a, 660b, 660c, and 660d. With this configuration, the prohibition regions 61a, 61b, 61c, and 61d are arranged so as to surround the through electrodes 62a, 62b, 62c, and 62d.

This can also be mentioned that through electrode regions of the four control blocks 660a, 660b, 660c, and 660d are adjacent to each other. In accordance with this arrangement, as compared to a case where each through electrode is arranged to be away from each other, the through electrode regions can be made smaller as a whole.

In addition, the respective circuits of the control blocks 660a and 660c which are adjacent in the Y direction are arranged to be vertically symmetric. It is noted however that it suffices when the arrangement of the circuits is symmetrical, and wirings in the circuits, directions of signal flows, input/output orders, and the like do not necessarily need to be symmetrical. With this configuration, since the circuits having a similar function are adjacent to each other between the adjacent control blocks 660, it is possible to omit the well separation band to increase the area efficiency.

In the example of FIG. 17, while two control blocks 660a and 660c adjacent in the Y direction are set as a unit, the control blocks 660 are repeatedly arranged using similar arrangements in the X direction and the Y direction to configure a control circuit unit 650. That is, the two control blocks 660a and 660c adjacent in the Y direction become a unit circuit group. In this case, between the control blocks 660 adjacent in the X direction across the repeating unit, the mutual through electrode regions 60 are adjacent. For example, in FIG. 17, the mutual through electrode regions are adjacent between the control blocks 660a and 660b too. With this configuration, the area efficiency can be further increased.

Figure 18:
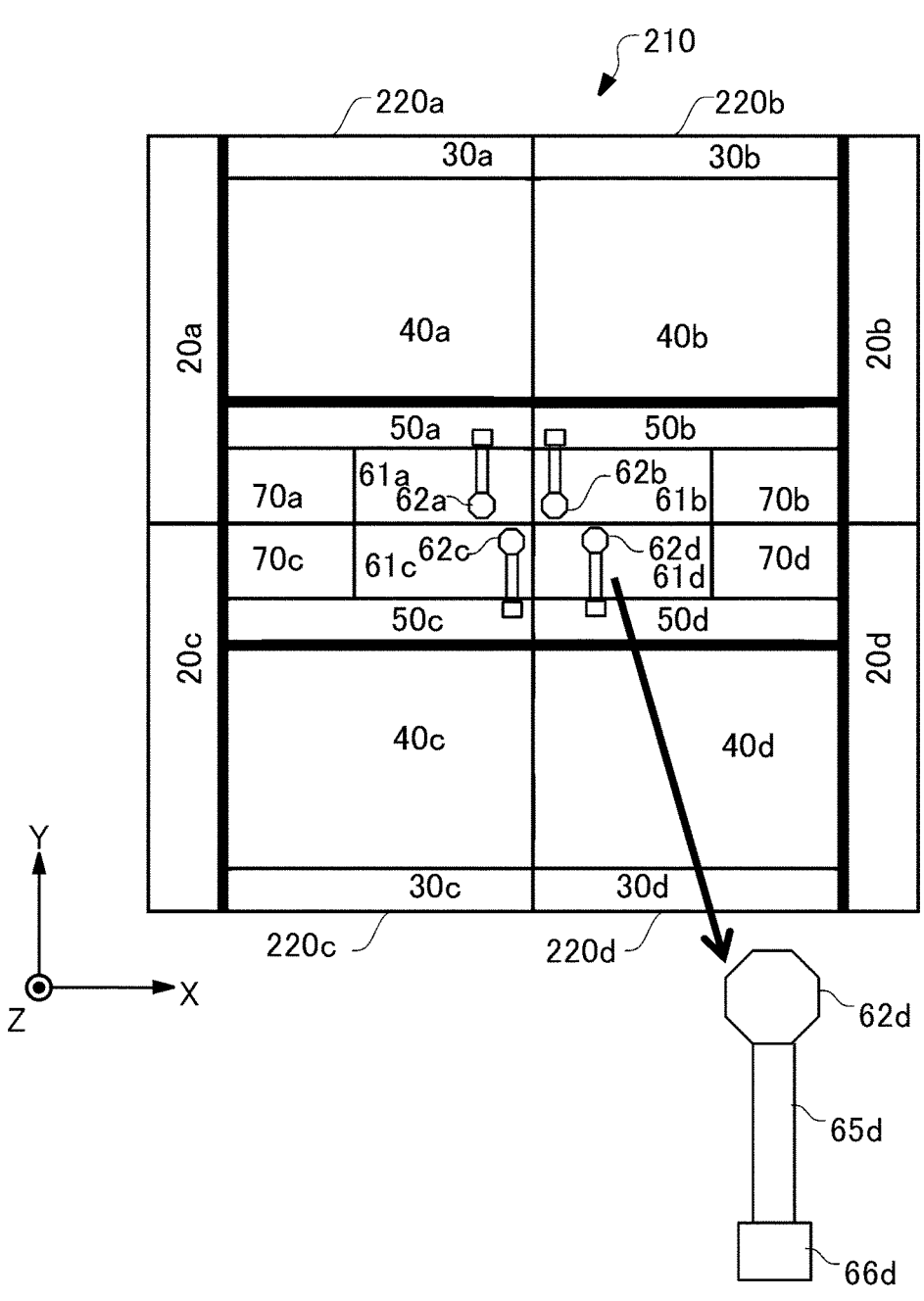
FIG. 18 is a schematic view illustrating a detail of an arrangement of a through electrode 62.

FIG. 18 is a schematic view illustrating a detail of an arrangement of the through electrode 62. As an example, FIG. 18 illustrates the arrangement of the through electrode 62 in an arrangement relationship of the plurality of control blocks 220 in FIG. 9, which can also be applied to the other control blocks 620, 640, and 660.

In the example of FIG. 18, the control blocks 220a, 220b, 220c, and 220d each have one of the through electrodes 62a, 62b, 62c, and 62d. Furthermore, as illustrated in an enlarged view on the lower right of FIG. 18, the through electrode 62d has an in-plane signal line 65d and a connection section 66d with which this signal line 65*d* is connected to another circuit. The same also applies to the other through electrodes 62*a*, 62*b*, and 62*c*.

The through electrode 62*a* is used such that a signal of the corresponding control block 220*a* is transmitted and received with the image processing unit 310. Similarly, the through electrodes 62*b*, 62*c*, and 62*d* are used such that signals of the corresponding control blocks 220*b*, 220*c*, and 220*d* are transmitted and received with the image processing unit 310. With this configuration, signals can be transmitted and received with the image processing unit 310 simultaneously and/or mutually independently from the control blocks 220*a*, 220*b*, 220*c*, and 220*d*.

Instead of this, the through electrodes 62*a*, 62*b*, 62*c*, and 62*d* may be shared by the control blocks 220*a*, 220*b*, 220*c*, and 220*d*. In this case, for example, the control blocks 220*b*, 220*c*, and 220*d* may use the through electrodes 62*a*, 62*b*, 62*c*, and 62*d* in a time division manner.

Note that the control blocks 220*a*, 220*b*, 220*c*, and 220*d* may each have two or more of the through electrodes 62*a*, 62*b*, 62*c*, and 62*d*.

Figure 19:
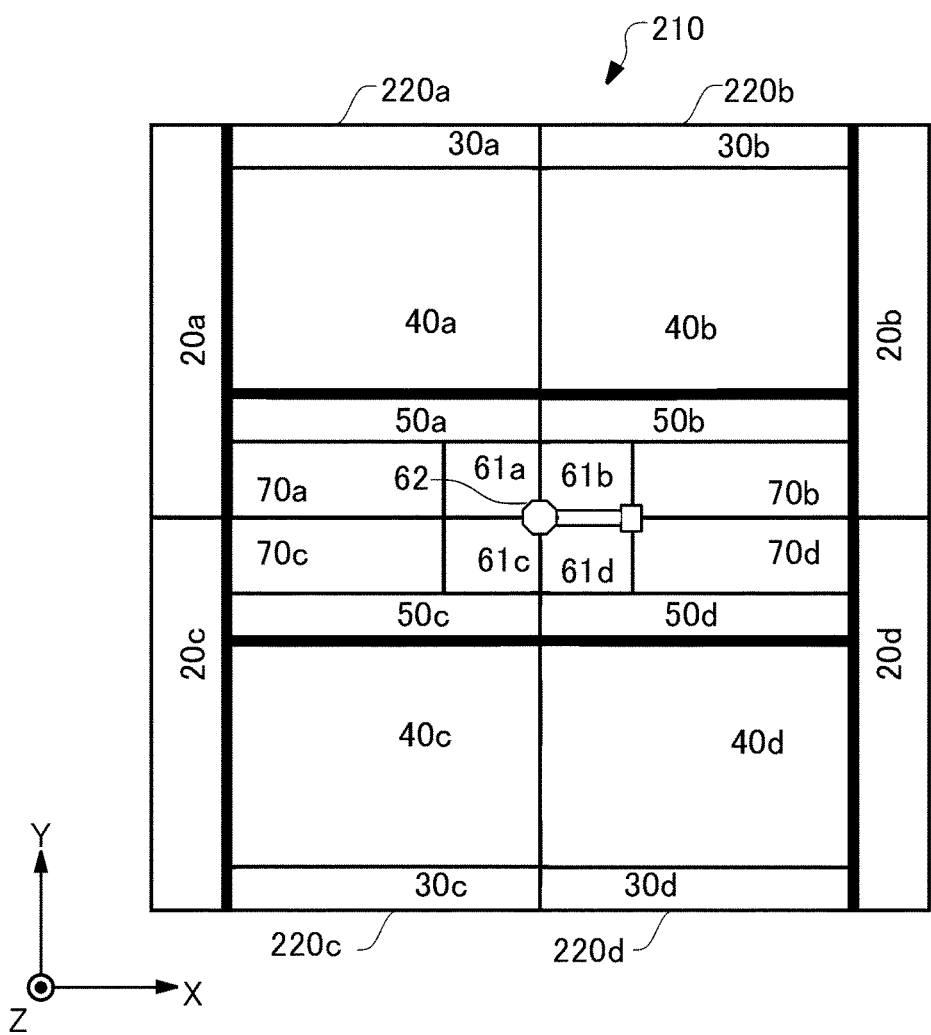
FIG. 19 is a schematic view illustrating a detail of the arrangement of the through electrode 62.

FIG. 19 is a schematic view illustrating a detail of the arrangement of the through electrode 62. As an example, FIG. 19 illustrates the arrangement of the through electrode 62 in the arrangement relationship of the plurality of control blocks 220 in FIG. 9, which can also be applied to the other control blocks 620, 640, and 660.

In the example of FIG. 19, the single through electrode 62 is provided for the four control blocks 220*a*, 220*b*, 220*c*, and 220*d*. That is, the single through electrode 62 is provided for the unit circuit group.

In this case, for example, the control blocks 220*a*, 220*b*, 220*c*, and 220*d* may use the through electrode 62 in a time division manner. In accordance with the example of FIG. 19, since it suffices when a number of through electrodes fewer than control blocks are arranged, the through electrode region 60 can be made still smaller to further increase the area efficiency. Note that the number of the shared through electrodes 62 is not limited to one, and may be two or three.

Note that in any of the above described embodiments too, the discharge unit 124 of the pixel 112 may be omitted. Furthermore, the transfer unit 123 may also be omitted, but in this case, the accumulation unit 125 does not have a function as a floating diffusion. In addition, the accumulation unit 125 and the pixel output unit 127 may be shared with another pixel. In addition, the pixel 112 may be configured by a plurality of photoelectric conversion units 104 and the first transfer unit 123. In addition, a term "adjacent" refers to being arranged to be aligned next to each other, and includes a case of being in contact with each other and a case of not being necessarily in contact with each other.

Figure 20:
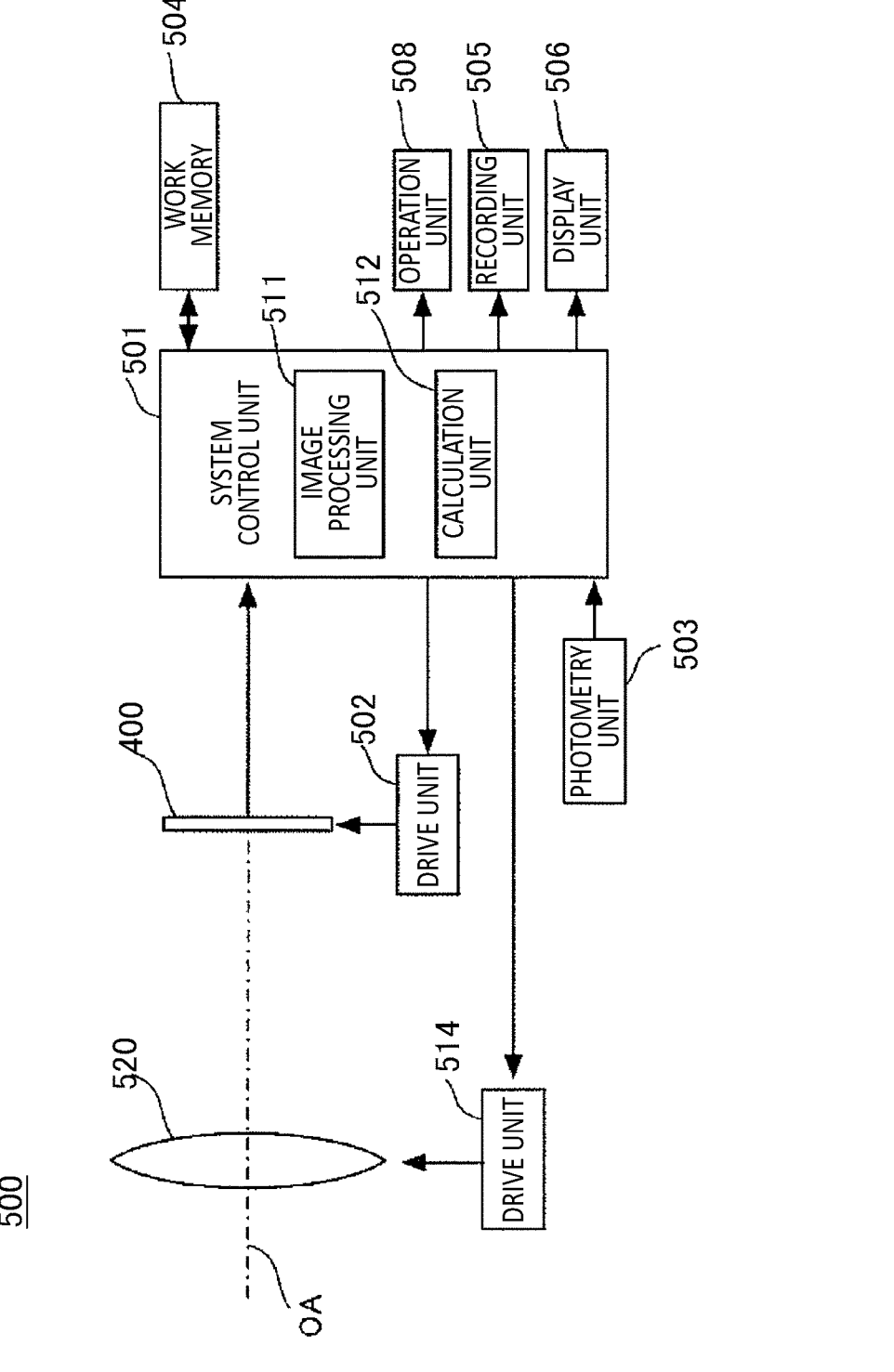
FIG. 20 is a block diagram illustrating a configuration example of an image capturing apparatus 500 according to an embodiment.

FIG. 20 is a block diagram showing a configuration example of an image capturing apparatus 500 according to an embodiment. The image capturing apparatus 500 includes the image capturing element 400, a system control unit 501, a drive unit 502, a photometry unit 503, a work memory 504, a recording unit 505, a display unit 506, a drive unit 514, and a photographing lens 520. An example in which the image capturing element 400 is included will be described but instead of this, the image capturing element 800 may be included.

The photographing lens 520 is configured to guide a subject light flux incident along an optical axis OA to the image capturing element 400. The photographing lens 520 includes a plurality of optical lens groups, and is configured to form an image of the subject light flux from a scene, in the vicinity of a focal plane of the photographing lens. The photographing lens 520 may be a replaceable lens that can be attached and detached with respect to the image capturing apparatus 500. Note that in FIG. 20, the photographing lens 520 is represented by one virtual lens arranged near the pupil.

The drive unit 514 is configured to drive the photographing lens 520. In an example, the drive unit 514 is configured to move the optical lens group of the photographing lens 520 to change a focusing position. In addition, the drive unit 514 may be configured to drive an iris diaphragm in the photographing lens 520 to control a light amount of the subject light flux incident on the image capturing element 400.

The drive unit 502 has a control circuit configured to execute electric charges accumulating control such as timing control and region control of the image capturing element 400 according to instructions from the system control unit 501. In addition, the operation unit 508 is configured to receive an instruction from a photographer using a release button or the like.

The image capturing element 400 is configured to transfer pixel signals to an image processing unit 511 of the system control unit 501. The image processing unit 511 is configured to generate image data by performing various image processing using the work memory 504 as a work space. For example, when generating image data of a JPEG file format, compression processing is executed after generating a color video signal from a signal obtained with the Bayer array. The generated image data is recorded in the recording unit 505, converted into a display signal, and displayed on the display unit 506 for a preset time.

The photometry unit 503 is configured to detect a luminance distribution of a scene prior to a series of photographing sequences for generating image data. The photometry unit 503 includes, for example, an AE sensor with approximately one million pixels. A calculation unit 512 of the system control unit 501 is configured to receive an output of the photometry unit 503 and to calculate a luminance for each region of the scene.

The calculation unit 512 is configured to decide a shutter speed, an aperture value, and an ISO sensitivity according to the calculated luminance distribution. The photometry unit 503 may also be used by the image capturing element 400. Note that the calculation unit 512 is also configured to execute various calculations for operating the image capturing apparatus 500. The drive unit 502 may be partially or entirely mounted on the image capturing element 400. A part of the system control unit 501 may be mounted on the image capturing element 400. In addition, the image capturing element 800 may be used instead of the image capturing element 400.

While the present invention has been described by way of the embodiments, the technical scope of the present invention is not limited to the above-described embodiments. It is apparent to persons skilled in the art that various alterations or improvements can be made to the above-described embodiments. It is apparent from the description of the claims that embodiments added with such alterations or improvements can also be included in the technical scope of the present invention.

It should be noted that the operations, procedures, steps, stages, and the like of each process performed by an apparatus, system, program, and method shown in the claims, embodiments, or diagrams can be realized in any order as long as the order is not indicated by "prior to," "before," or the like and as long as the output from a previous process is not used in a later process. Even if the operation flow is described using phrases such as "first" or "next" in the claims, embodiments, or diagrams for convenience, it does not necessarily mean that the process must be performed in this order.

EXPLANATION OF REFERENCES

20: pixel drive unit; 30: linking unit; 40: conversion unit; 50, 326: signal output unit; 60, 360: through electrode region; 61, 361: prohibition region; 62, 64, 362, 364: through electrode; 70, 370: local I/O; 80: control circuit; 100: first substrate; 104: photoelectric conversion unit; 110: pixel unit; 112: pixel; 120: pixel block; 121: load current source; 122, 162, 237, 238, 352, 354: signal line; 123: transfer unit; 124: discharge unit; 125: accumulation unit; 126: reset unit; 127: pixel output unit; 128: amplification unit; 129: selection unit; 130: power supply line, 132: ground line; 141: transfer control line; 142: discharge control line; 143: reset control line; 145: selection control line; 147: transfer selection control line; 152: bump; 160: I/O unit, 200: second substrate; 210, 610, 630, 650: control circuit unit; 220, 620, 640, 660: control block; 230, 330, 603: peripheral circuit unit; 234: global drive unit; 236: ADC setting unit; 310: image processing unit; 320: processing block; 322: signal input unit; 324: processing unit; 400: image capturing element; 500: image capturing apparatus; 501: system control unit; 502: drive unit; 503: photometry unit; 504: work memory; 505: recording unit; 506: display unit; 508: operation unit, 511: image processing unit; 512: calculation unit; 514: drive unit; 520: photographing lens; 800: image capturing element.

What is claimed is:

1. An image capturing element comprising:

a first substrate having a pixel unit in which are arranged a first photoelectric conversion unit which converts light into electric charges and a second photoelectric conversion unit which converts light into electric charges;

a second substrate having a control circuit unit in which are arranged a first control block and a second control block, the first control block including a first conversion unit which converts a first signal which is based on the electric charges converted by the first photoelectric conversion unit into a digital signal, and a first through electrode unit in which is formed a first through hole of a first through electrode, from which is output a first digital signal converted from the first signal into the digital signal by the first conversion unit, the second control block including a second conversion unit which converts a second signal which is based on the electric charges converted by the second photoelectric conversion unit into a digital signal, and a second through electrode unit in which is formed a second through hole of a second through electrode, from which is output a second digital signal converted from the second signal into the digital signal by the second conversion unit, the second substrate being stacked with the first substrate; and a third substrate that has a processing unit which performs processing on the first digital signal output from a third through electrode and the second digital signal output from a fourth through electrode, the third substrate including (i) a third through electrode unit, in which is formed a third through hole of a third through electrode that is electrically connected to the first through electrode, and (ii) a fourth through electrode unit, in which is formed a fourth through hole of a fourth through electrode that is electrically connected to the second through electrode, the third substrate being stacked with the first substrate.

2. The image capturing element according to claim 1, wherein the processing unit is arranged at a position that overlaps with the control circuit unit in a direction in which the second substrate and the third substrate are stacked.

3. The image capturing element according to claim 1, wherein the processing unit performs processing of decreasing at least one of an amount of data of the first digital signal and an amount of data of the second digital signal.

4. The image capturing element according to claim 1, wherein the processing unit performs processing of compressing at least one of an amount of data of the first digital signal and an amount of data of the second digital signal.

5. The image capturing element according to claim 1, wherein the processing unit includes (i) a first processing block, which includes the third through electrode unit and a first processing unit which performs processing of decreasing an amount of data of the first digital signal, and (ii) a second processing block, which includes the fourth through electrode unit and a second processing unit which performs processing of decreasing an amount of data of the second digital signal.

6. The image capturing element according to claim 1, wherein the processing unit includes (i) a first processing block, which includes the third through electrode unit and a first processing unit which performs processing of compressing an amount of data of the first digital signal, and (ii) a second processing block, which includes the fourth through electrode unit and a second processing unit which performs processing of compressing an amount of data of the second digital signal.

7. The image capturing element according to claim 5, wherein the first processing block is arranged at a position that overlaps with the first control block in a direction in which the second substrate and the third substrate are stacked, and the second processing block is arranged at a position that overlaps with the second control block in the direction in which the second substrate and the third substrate are stacked.

8. The image capturing element according to claim 1, wherein the third substrate has a fifth through electrode unit in which is formed a fifth through hole for a fifth through electrode, from which is output at least one of the first digital signal processed by the processing unit and the second digital signal processed by the processing unit.

9. The image capturing element according to claim 8, wherein the fifth through electrode unit is arranged outside of the processing unit in the third substrate.

10. The image capturing element according to claim 8, wherein the second substrate has a sixth through electrode unit in which is formed a sixth through hole for a sixth through electrode electrically connected to the fifth through electrode.

11. The image capturing element according to claim 10, wherein the first substrate includes an I/O unit that is electrically connected to the sixth through electrode.

12. The image capturing element according to claim 11, wherein the I/O unit is arranged outside of the pixel unit in the first substrate.

13. The image capturing element according to claim 1, wherein the first through electrode unit has a first through electrode region in which the first through hole is formed and a first element arrangement prohibition region in which an arrangement of a semiconductor element is prohibited, and the second through electrode unit has a second through electrode region in which the second through hole is formed and a second element arrangement prohibition region in which an arrangement of a semiconductor element is prohibited.

14. The image capturing element according to claim 13, wherein the second control block is arranged next to the first control block, and the first through electrode region and the second through electrode region are arranged so as to be surrounded by the first element arrangement prohibition region and the second element arrangement prohibition region.

15. The image capturing element according to claim 14, wherein the second control block is arranged next to the first control block in a row direction, and the first through electrode region and the second through electrode region are arranged between the first element arrangement prohibition region and the second element arrangement prohibition region in the row direction.

16. The image capturing element according to claim 14, wherein the second control block is arranged next to the first control block in a column direction, and the first through electrode region and the second through electrode region are arranged between the first element arrangement prohibition region and the second element arrangement prohibition region in the column direction.

17. The image capturing element according to claim 1, wherein:

the pixel unit includes a first pixel block including the first photoelectric conversion unit, a first transfer unit configured to transfer the electric charges converted by the first photoelectric conversion unit, a first accumulation unit to which the electric charges converted by the first photoelectric conversion unit are transferred by the first transfer unit, and a first reset unit configured to discharge the electric charges of the first accumulation unit, and a second pixel block including the second photoelectric conversion unit, a second transfer unit configured to transfer the electric charges converted by the second photo-electric conversion unit, a second accumulation unit to which the electric charges converted by the second photoelectric conversion unit are transferred by the second transfer unit, and a second reset unit configured to discharge the electric charges of the second accumulation unit;

the first control block outputs a first transfer control signal for controlling the first transfer unit; and the second control block outputs a second transfer control signal for controlling the second transfer unit.

18. The image capturing element according to claim 17, wherein the first control block is arranged at a position that overlaps with the first pixel block in a direction in which the first substrate and the second substrate are stacked, and the second control block is arranged at a position that overlaps with the second pixel block in a direction in which the first substrate and the second substrate are stacked.

19. The image capturing element according to claim 17, wherein the second substrate has a drive unit configured to output a reset control signal for controlling the first reset unit and the second reset unit.

20. The image capturing element according to claim 19, wherein the drive unit is arranged outside of the control circuit unit in the second substrate.

21. The image capturing element according to claim 19, comprising:

a first transfer control line, from which the first transfer control signal is output, that is electrically connected to the first transfer unit;

a second transfer control line, from which the second transfer control signal is output, that is electrically connected to the second transfer unit; and a reset control line, from which the reset control signal is output, that is electrically connected to the first reset unit and the second reset unit.

22. The image capturing element according to claim 17, wherein:

the first pixel block has a first discharge unit for discharging the electric charges of the first photoelectric conversion unit;

the second pixel block has a second discharge unit for discharging the electric charges of the second photoelectric conversion unit;

the first control block outputs a first discharge control signal for controlling the first discharge unit; and the second control block outputs a second discharge control signal for controlling the second discharge unit.

23. The image capturing element according to claim 22, comprising:

a first discharge control line, from which the first discharge control signal is output, that is electrically connected to the first discharge unit; and a second discharge control line, from which the second discharge control signal is output, that is electrically connected to the second discharge unit.

24. An imaging apparatus comprising the image capturing element according to claim 1.

* * * * *